United States Patent
Weil et al.

(10) Patent No.: US 10,992,623 B2
(45) Date of Patent: Apr. 27, 2021

(54) DIGITAL MEDIA MESSAGES AND FILES

(71) Applicant: NightLight Systems LLC, Wilmington, DE (US)

(72) Inventors: Joseph Weil, Novato, CA (US); William Joseph Martinez, San Francisco, CA (US); Andrew Jarecki, New York, NY (US); Andrew Ross Cooperman, Brooklyn, NY (US)

(73) Assignee: NightLight Systems LLC, Wilmington, DE (US)

( * ) Notice: Subject to any disclaimer, the term of this patent is extended or adjusted under 35 U.S.C. 154(b) by 0 days.

(21) Appl. No.: 16/909,870

(22) Filed: Jun. 23, 2020

(65) Prior Publication Data

US 2020/0322296 A1    Oct. 8, 2020

Related U.S. Application Data

(63) Continuation of application No. 15/683,120, filed on Aug. 22, 2017, now Pat. No. 10,735,360, which is a
(Continued)

(51) Int. Cl.
*G06F 3/048* (2013.01)
*H04L 12/58* (2006.01)
(Continued)

(52) U.S. Cl.
CPC .............. *H04L 51/10* (2013.01); *G06F 3/017* (2013.01); *G06F 3/0488* (2013.01);
(Continued)

(58) Field of Classification Search
CPC ...... G06F 3/017; G06F 3/0482; G06F 3/0485; G06F 3/04842; H04L 51/10; H04L 51/22
See application file for complete search history.

(56) References Cited

U.S. PATENT DOCUMENTS 6,262,724 B1    7/2001 Crow et al.
6,624,826 B1    9/2003 Balabanovic
(Continued)

FOREIGN PATENT DOCUMENTS

CN      1868201 A    11/2006
CN    101114260 A     1/2008
(Continued)

OTHER PUBLICATIONS

"Video Editor 8.1 brings video editing with awesome video effects to windows phone", retrieved on Apr. 8, 2016 at <<http://mspoweruser.com/video-editor-8-1-brings-video-editing-with-awesome-video-effects-to-windows-phone/>>, 2016, 2 pages.
(Continued)

*Primary Examiner* — Claudia Dragoescu
(74) *Attorney, Agent, or Firm* — Invoke

(57) ABSTRACT

A method includes capturing a digital content segment, generating a first identifier, and associating the first identifier with a digital image in the memory of an electronic device. The method also includes generating a second identifier and associating the second identifier with a digital content segment in the memory. The method further includes transferring at least one of the digital image and the digital content segment to a server computer via a network, wherein the first identifier is transferred in association with the digital image and the second identifier is transferred in association with the digital content segment. The method also includes generating an electronic file providing a sequential clip listing associated with rendering a digital media message. The electronic file includes the first and second identifiers, a first indicator identifying a first frame of the digital media message, and a second indicator identifying a second frame of the digital media message.

20 Claims, 14 Drawing Sheets

Related U.S. Application Data continuation of application No. 15/094,557, filed on Apr. 8, 2016, now abandoned, which is a continuation-in-part of application No. 14/683,779, filed on Apr. 10, 2015, now Pat. No. 10,037,185, which is a continuation-in-part of application No. 14/569,169, filed on Dec. 12, 2014, now Pat. No. 9,973,459.

(60) Provisional application No. 62/146,045, filed on Apr. 10, 2015, provisional application No. 62/042,114, filed on Aug. 26, 2014, provisional application No. 62/038,493, filed on Aug. 18, 2014.

(51) Int. Cl.
| | | |
|---|---|---|
| *H04L 29/08* | (2006.01) | |
| *G06F 3/16* | (2006.01) | |
| *G06F 3/0484* | (2013.01) | |
| *G06F 3/0488* | (2013.01) | |
| *G06F 3/01* | (2006.01) | |

(52) U.S. Cl.
CPC ...... *G06F 3/04842* (2013.01); *G06F 3/04845* (2013.01); *G06F 3/167* (2013.01); *H04L 51/22* (2013.01); *H04L 67/06* (2013.01); *G06F 2203/0381* (2013.01); *H04L 51/08* (2013.01)

(56) References Cited

U.S. PATENT DOCUMENTS

| | | | |
|---|---|---|---|
| 7,209,167 | B2 | 4/2007 | Pyle et al. |
| 7,353,282 | B2 | 4/2008 | Nichols et al. |
| D597,101 | S | 7/2009 | Chaudhri et al. |
| 7,562,302 | B1 | 7/2009 | Barrus et al. |
| D621,849 | S | 8/2010 | Anzures et al. |
| D626,138 | S | 10/2010 | McLaughlin et al. |
| 7,873,911 | B2 | 1/2011 | Gopalakrishnan |
| 8,290,777 | B1 | 10/2012 | Nguyen et al. |
| 8,428,453 | B1 | 4/2013 | Spiegel et al. |
| D701,526 | S | 3/2014 | Poston et al. |
| D701,533 | S | 3/2014 | Jin et al. |
| D704,205 | S | 5/2014 | Greisson et al. |
| 8,737,815 | B2 | 5/2014 | Singer |
| D727,931 | S | 4/2015 | Kim et al. |
| D728,590 | S | 5/2015 | Kim et al. |
| 9,323,733 | B1 | 4/2016 | McGhee et al. |
| 2003/0063130 | A1 | 4/2003 | Barbieri et al. |
| 2003/0167264 | A1 | 9/2003 | Ogura et al. |
| 2003/0221541 | A1* | 12/2003 | Platt .................. G10H 1/0058 84/609 |
| 2004/0070608 | A1 | 4/2004 | Saka |
| 2004/0075663 | A1 | 4/2004 | Plante |
| 2006/0139340 | A1 | 6/2006 | Geaghan |
| 2008/0229204 | A1 | 9/2008 | Johnson et al. |
| 2009/0013001 | A1 | 1/2009 | Park et al. |
| 2009/0100068 | A1 | 4/2009 | Gauba et al. |
| 2009/0106200 | A1 | 4/2009 | Salinas et al. |
| 2009/0263044 | A1 | 10/2009 | Imagawa et al. |
| 2009/0304359 | A1* | 12/2009 | Lemay ............. H04N 21/41407 386/353 |
| 2009/0327856 | A1 | 12/2009 | Mouilleseaux et al. |
| 2010/0064239 | A1 | 3/2010 | Crawford et al. |
| 2010/0077289 | A1 | 3/2010 | Das et al. |
| 2010/0095240 | A1 | 4/2010 | Shiplacoff et al. |
| 2010/0125791 | A1 | 5/2010 | Katis et al. |
| 2010/0223314 | A1 | 9/2010 | Gadel et al. |
| 2011/0086616 | A1 | 4/2011 | Brand et al. |
| 2011/0163969 | A1 | 7/2011 | Anzures et al. |
| 2011/0163971 | A1* | 7/2011 | Wagner ............... G06F 3/04845 345/173 |
| 2011/0229111 | A1 | 9/2011 | Bonarrigo et al. |
| 2011/0258547 | A1 | 10/2011 | Symons et al. |
| 2011/0264755 | A1 | 10/2011 | Salvatore De Villiers |
| 2012/0005595 | A1 | 1/2012 | Gavade et al. |
| 2012/0066594 | A1 | 3/2012 | Gavade et al. |
| 2012/0151346 | A1 | 6/2012 | McClements, IV |
| 2012/0284094 | A1 | 11/2012 | De et al. |
| 2012/0308209 | A1 | 12/2012 | Zaletel |
| 2013/0034341 | A1 | 2/2013 | Ichikawa et al. |
| 2013/0055087 | A1 | 2/2013 | Flint |
| 2013/0132904 | A1 | 5/2013 | Primiani et al. |
| 2013/0173727 | A1 | 7/2013 | Libin et al. |
| 2013/0212521 | A1 | 8/2013 | Fedoseyeva et al. |
| 2013/0282514 | A1 | 10/2013 | Dougherty et al. |
| 2013/0294746 | A1 | 11/2013 | Oz et al. |
| 2014/0007257 | A1 | 1/2014 | Dougherty et al. |
| 2014/0055633 | A1 | 2/2014 | Marlin et al. |
| 2014/0100893 | A1 | 4/2014 | Zizzi |
| 2014/0108928 | A1 | 4/2014 | Mumick |
| 2014/0147095 | A1 | 5/2014 | Oz et al. |
| 2014/0163957 | A1 | 6/2014 | Tesch et al. |
| 2014/0163980 | A1 | 6/2014 | Tesch et al. |
| 2014/0310748 | A1 | 10/2014 | Dureau et al. |
| 2015/0092006 | A1 | 4/2015 | Grossman et al. |
| 2015/0095804 | A1* | 4/2015 | Grossman ........... G06F 3/04883 715/753 |
| 2015/0382056 | A1 | 12/2015 | Burton et al. |
| 2016/0048306 | A1 | 2/2016 | Weil et al. |
| 2016/0048313 | A1 | 2/2016 | Weil et al. |
| 2016/0048373 | A1 | 2/2016 | Weil et al. |
| 2016/0050172 | A1 | 2/2016 | Weil et al. |
| 2016/0203112 | A1 | 7/2016 | Asamani et al. |
| 2016/0205431 | A1 | 7/2016 | Avedissian et al. |
| 2016/0226806 | A1 | 8/2016 | Weil et al. |

FOREIGN PATENT DOCUMENTS

| | | |
|---|---|---|
| CN | 101262418 A | 9/2008 |
| CN | 101652972 A | 2/2010 |
| CN | 102651731 A | 8/2012 |
| CN | 103154876 A | 6/2013 |
| CN | 103164152 A | 6/2013 |
| CN | 103842936 A | 6/2014 |
| CN | 107003720 A | 8/2017 |
| EP | 3183644 A1 | 6/2017 |
| WO | 2011/098925 A1 | 8/2011 |
| WO | 2014/100893 A1 | 7/2014 |
| WO | 2016/028394 A1 | 2/2016 |
| WO | 2016/028395 A1 | 2/2016 |
| WO | 2016/028396 A1 | 2/2016 |
| WO | 2016/028397 A1 | 2/2016 |

OTHER PUBLICATIONS

Decneut et al., "Targeting heterogeneous multimedia environments with Web services", Proceedings of IEEE International Conference on Web Services, 2004, pp. 682-689.

How to Sent Voice Messages in WhatsApp, Aug 12, 2013, https://www.youtube.com/watch?v=mkJqYO984v0.

Nguyen, N., "Stop, Collaborate, and Remix: Meet MixBit, an Mobile Video Editor", retrieved on Apr. 8, 2016 at <<http://www.popsugar.com/tech/MixBit-Video-App-31107598>>, 2016, 5 pages.

Pizano et al., "Integrated multimedia messaging concepts and applications", Proceedings of the 1996 ACM symposium on Applied Computing SAC '96, 1996, pp. 12-16.

Proof Snapchat Doesn't Delete Your Photos/Videos After They Expire, May 17, 2013, https://www.youtube.com/watch?v=xPHsM9gXOnY.

Snapchat—Now with Video, Dec. 13, 2012, https://www.youtube.com/watch?v=r4237MZlb8g.

Wochit, "How it Works: Details on our Video Creation Platform," retrieved Nov. 25, 2015 at <<https://www.wochit.com/how-it-works/>>, Wochit Inc., 2015.

* cited by examiner

DIGITAL MEDIA MESSAGES AND FILES

INCORPORATION BY REFERENCE; DISCLAIMER

Each of the following applications are hereby incorporated by reference: application Ser. No. 15/683,120 filed on Aug. 22, 2017; application Ser. No. 15/094,557 filed on Apr. 8, 2016; application No. 62/146,045 filed on Apr. 10, 2015; application Ser. No. 14/683,779 filed on Apr. 10, 2015; application Ser. No. 14/569,169 filed on Dec. 12, 2014; application No. 62/042,114 filed on Aug. 26, 2014; application No. 62/038,493 filed on Aug. 18, 2014. The Applicant hereby rescinds any disclaimer of claim scope in the parent application(s) or the prosecution history thereof and advises the USPTO that the claims in this application may be broader than any claim in the parent application(s).

BACKGROUND

It is common for users of electronic devices to communicate with other remote users by voice, email, text messaging instant messaging, and the like. While these means of electronic communication may be convenient in various situations, such means are only suited for transferring a limited amount of rich content between users. For instance, while text messages and email may be used to transmit written dialogue between users, and audio, video, web content, or other files may be transmitted with the text or email messages as attachments, such files are not integrated with the van us components of the text or email message in any way.

As a result of these shortcomings, electronic device messaging applications have been developed to assist the user in creating digital messages that include, for example, images, audio, video, and other content. However, the functionality of existing messaging applications is limited. For example, such applications generally do not enable the user to combine a wide array of digital content segments (e.g., an audio segment, a video segment, a digital image, etc.) such that two or more content segments, such as segments from different sources, can be presented to the recipient simultaneously as an integrated component of the digital message. Additionally, while such content segments may be captured and/or saved locally on a user device, sharing such content segments with other user devices as part of the digital message and via such applications can be cumbersome due to the size of the audio files, video files, and/or other components of such content segments. For example, large audio files, video files, and the like can require significant memory for storage locally on a user device, and can also require a substantial amount of bandwidth to upload and/or download on most wireless networks. As a result, handling such content segments can place significant strain on user device resources and network resources, and can hinder device and/or network performance. Further, traditional techniques for rendering digital messages require that the video rendering and content upload processes begin only after a user has finished generating and/or composing the message. This constraint can result in prolonged upload/render tunes once the message is complete.

Example embodiments of the present disclosure are directed toward curing one or more of the deficiencies described above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
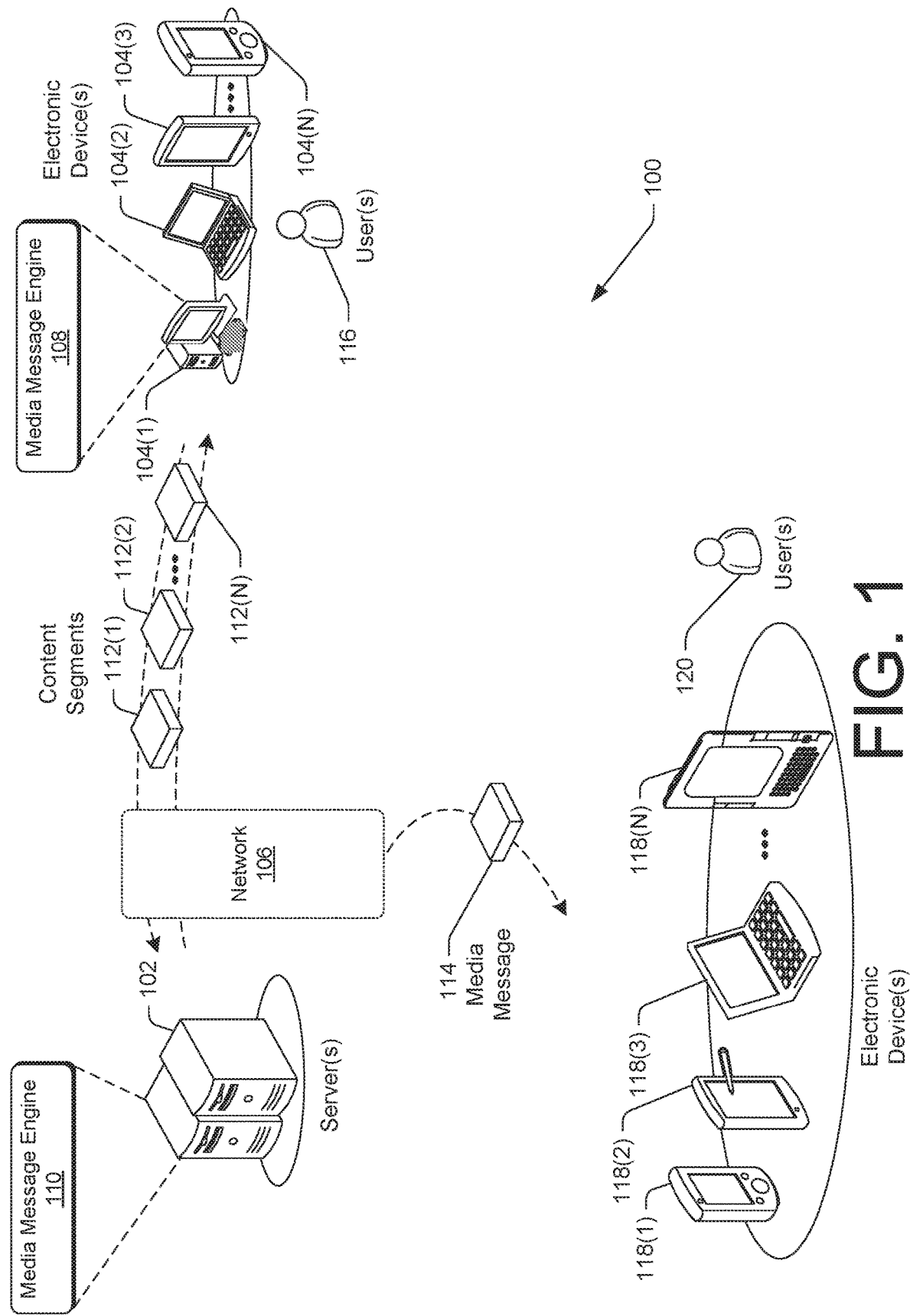
FIG. 1 is a schematic diagram of an illustrative computing environment for implementing various embodiments of digital media message generation.

The disclosure is directed to devices and techniques for generating digital media messages that can be easily shared between users of electronic devices as a means of communication. The techniques described herein enable users to combine a variety of different digital content segments into a single digital media message. For example, the user may create a digital media message by capturing audio content segments, video content segments, digital images, web content, and the like. Such content segments may be captured by the user during generation of the digital media message. Alternatively, such content segments may be captured by the user prior to generating the digital media message and may be saved in a memory of the electronic device, or in a cloud-based memory, for incorporation into the digital media message.

In various embodiments, replacing, for example, part of a video track of an underlying digital video segment with a digital image may reduce the file size of the resulting digital media message. In particular, the replaced portion of the video track may typically be rendered at approximately 300 frames/second for a duration of the portion of the video track, and may be characterized by a commensurate memory and/or file size (e.g., in bytes). The selected digital image, on the other hand, may comprise a single frame that may be rendered for the duration of the replaced portion of the video track. Thus, replacing a portion of the video track of the underlying digital video segment with the digital image may reduce the number of frames/second of the underlying video segment, thereby reducing file size thereof. As a result, a digital media message generated using such techniques may have a smaller file size and may require/take up less memory than a corresponding digital media message generated using the underlying digital video segment with the video track unchanged (e.g., without replacing a portion of the video track with a selected digital image).

Reducing the file size and/or memory requirements of digital media messages in this way has many technical effects and/or advantages. For example, such a reduction in file size and/or memory requirements will enable the various networks, servers, and/or electronic devices described herein to transfer and/or render digital media messages more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks, servers, and/or electronic devices described herein to provide, render, display, and/or otherwise process such digital media messages more quickly and with fewer network, server, and/or device resources. In particular, such a reduced file size may reduce the server and/or electronic device memory required to receive and/or store such messages. Such a reduced file size may also reduce the processor load required to provide, render, display, and/or otherwise process such digital media messages. As a result, such a reduction in file size and/or memory requirements will reduce overall network load/traffic, and will improve network, server, and/or electronic device performance and efficiency. Additionally, various embodiments of the present disclosure may enable digital content segments associated with the digital media message to be uploaded to a server computer or other cloud-based resource substantially in real time. In some examples, various digital content segments associated with the digital media message being created may be transferred to such a server computer while the digital content segment is being captured by a user device. As a result, the time required for transferring and/or rendering the finished digital media message on an additional user device may be greatly reduce.

Illustrative environments, devices, and techniques for generating digital media messages are described below. However, the described message generation techniques may be implemented in other environments and by other devices or techniques, and this disclosure should not interpreted as being limited to the example environments, devices, and techniques described herein.

Illustrative Architecture

FIG. 1 is a schematic diagram of an illustrative computing environment 100 for implementing various embodiments of digital media message generation. The computing environment 100 may include server(s) 102 and one or more electronic devices 104(1)-104(N) (collectively "electronic devices 104") that are communicatively connected by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, they distribution techniques may be implemented that transmit information via memory cards, flash memory, or other portable memory devices.

A media message engine 108 on the electronic devices 104 and/or a media message engine 110 on the server(s) 102 may receive one or more digital content segments 112(1)-112(N) (collectively, "digital content segments 112" or "content segments 112") and may generate one or more digital media messages 114 (or "media messages 114") based on the content segments 112. In example embodiments, the media message engine 108 may receive one or more content segments 112 via interaction of a user 116 with an electronic device 104. In some embodiments, the media message engine 108 may provide such content segments 112 to the media message engine 110 on the server 102, via the network 106, to generate at least a portion of the media message 114. Alternatively, at least a portion of the media message 114 may be generated by the media message engine 108 of the respective electronic device 108. In either example, the media message 114 may be directed to one or more additional electronic devices 118(1)-118(N) (collectively "electronic device 118") via the network 106. Such electronic devices 118 may be disposed at a location remote from the electronic devices 104, and one or more users 120 may consume the digital media message 114 via one or more of the electronic devices 118.

Each of the electronic devices 104 may include a display component, a digital camera, and an audio input and transmission component. Such audio input and transmission components may include one or more microphones. The electronic devices 104 may also include hardware and/or software that support voice over Internet Protocol (VoIP) as well as any of the display, input, and/or output components described herein. Each of the electronic devices 104 may further include a web browser that enables the user 116 to navigate to a web page via the network 106. In some embodiments, the user 116 may generate and/or capture one or more digital content segments 112 using, for example, the camera and the microphone. For example, the user 116 may capture one or more digital images using the camera and/or may capture one or more video clips using the camera in conjunction with the microphone. Additionally, each web page may present content that the user 116 may capture via the electronic device 104, using various copy and/or save commands included in the web browser of the electronic device 104, and the user may incorporate such content into one or more content segments 112. Any of the content segments 112 described herein may be provided to one or both of the media message engines 108, 110, and the media message engines 108, 110 may incorporate such content segments 112 into the media message 114.

Upon receiving the content segments 112 described herein, the media message engines 108, 110 may tag the respective content segments 112 with associated metadata. The associated metadata may include profile information about the type of content (e.g., image, video, audio, text, animation, etc.), the source of the content segment 112 (e.g., camera, microphone, internet web page, etc.), and/or a position in a play sequence of the digital media message 114 with which the content segment 112 is to be associated.

The media message engines 108, 110 described herein may integrate and/or otherwise combine two or more digital content segments 112 to form the digital media message 114. In some examples, the digital content segments 112 may be presented to the user sequentially when the media message 114 is played. Alternatively, the media message engines 108, 110 may combine two or more digital content segments 112 such that the combined digital content segments 112 are presented simultaneously when the media message 114 is played. The media message engines 108, 110 may also distribute the finalized media message 114 to one or more of the electronic devices 118. Various example components and functionality of the media message engines 108, 110 will be described in greater detail below with respect to, for example, FIGS. 2 and 3.

In various embodiments, the electronic devices 104, 118 may include a mobile phone a portable computer, a tablet computer, an electronic book reader device "eBook reader device"), or other devices. Each of the electronic devices 104, 118 may have software and hardware components that enable the display of digital content segments 112, either separately or combined, as well as the various digital media messages 114 described herein. The electronic devices 104, 118 noted above are merely examples, and other electronic devices that are equipped with network communication components, data processing components, electronic displays for displaying data, and audio output capabilities may also be employed.

Example Server

Figure 2:
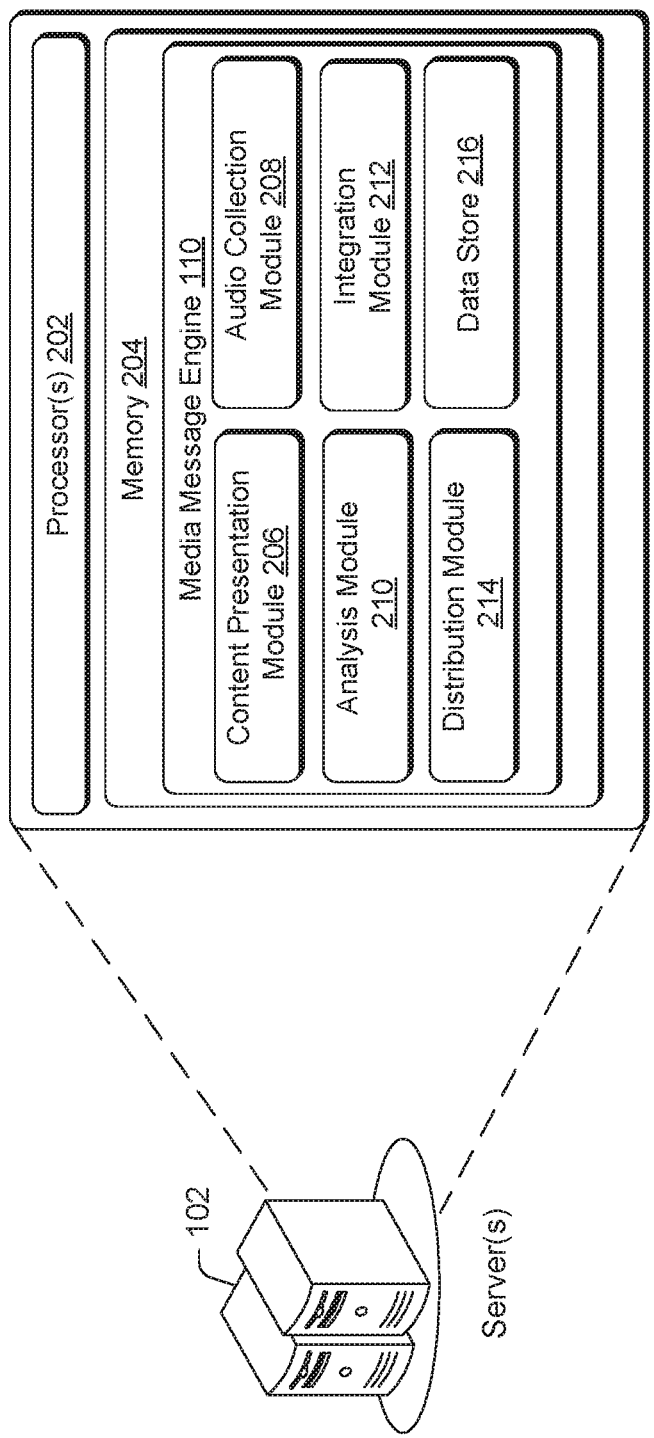
FIG. 2 is a schematic diagram of illustrative components in an example server computer that may be used in an example digital media message generation environment.

FIG. 2 is a schematic diagram of illustrative components in example server(s) 102 of the present disclosure. The server(s) 102 may include one or more processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The media message engine 110 may be a hardware or a software component of the server(s) 102 and in some embodiments, the media message engine 110 may comprise a component of the memory 204. As shown in FIG. 2, in some embodiments the media message engine 110 may include one or more of a content presentation module 206, a segment collection module 208, an analysis module 210, an integration module 212, and a distribution module 214. The modules may include routines, programs instructions, objects, and/or data structures that perform particular tasks or implement particular abstract data types. The server(s) 102 may also implement a data store 216 that stores data, digital content segments 112, and/or other information or content used by the media message engine 110.

The content presentation module 206 may enable a human reader to select digital content segments 112 for the purpose of including the selected digital content segments 112 in a digital media message 114. In various embodiments, the content presentation module 206 may present a web page to a user 116 of an electronic device 104, such as via the network 106. In further embodiments, the content presentation module 206 may present digital content, information, and/or one or more digital content segments 112 to the user 116 of an electronic device 104 via the network 106. The content presentation module 206 may also enable the user 116 to select content, information, and/or one or more digital content segments 112. Once the user 116 has selected, for example, a digital content segment 112, the content presentation module 206 may present further content, information, and/or digital content segments 112 to the user 116. The content presentation module 206 may also tag the selected digital content segment 112 for inclusion in the digital media message 114.

The segment collection module 208 may collect audio recordings, video recordings, images, files, web content, audio files, video files, web addresses, and/or other digital content segments 112 identified, selected, and/or captured by the user 116. Additionally, the segment collection module 208 may label each digital content segment 112 with metadata. The metadata may include profile information about the type of content (e.g., image, video, audio, text, animation, etc.), the source of the content segment 112 (e.g., camera, microphone, internet web page, etc.), and/or a position in a play sequence of the digital media message 114 with which the content segment 112 is to be associated. For example, the metadata for an audio recording may include identification information identifying the digital content segment 112 as comprising an audio recording, information indicating that the digital content segment 112 was captured using a microphone of an electronic device 104, information indicating the date and time of recordation, the length of the recording, and/or other information. Such metadata may be provided to the content presentation module 206 by the segment collection module 208 or alternatively, such metadata may be provided to the segment collection module 208 by the content presentation module 206.

The analysis module 210 may be used by the segment collection module 208 to determine whether a collected content segment 112 meets certain quality criteria. In various embodiments, the quality criteria may include whether a background noise level in the content segment 112 is below a maximum noise level, whether video and/or image quality in the content segment 112 is above a minimum pixel or other like quality threshold, and so forth.

The integration module 212 may use at least a portion of the metadata described above to assess and/or otherwise determine which content segment 112 to select for integration into the digital media message 114. Additionally or alternatively, the integration module 212 may use results received from the analysis module 210 to make one or more such determinations. Such determinations may be provided to the user 116 of the electronic device 104 while a digital media message 114 is being generated as a way of guiding the user with regard to the combination of one or more content segments 112. For instance, the integration module 212 may provide advice, suggestions, or recommendations to the user 116 as to which content segment 112 to select for integration into the digital media message 114 based on one or more of the factors described above.

The distribution module 214 may facilitate presentation of the digital media message 114 to one or more users 120 of the electronic devices 118. For example, once completed, the distribution module 214 may direct the digital media message 114 to one or more of the electronic devices 118 via the network 106. Additionally or alternatively, the distribution module 214 may be configured to direct one or more digital content segments 112 between the servers 102 and one or more of the electronic devices 104. In such embodiments, the distribution module 214 may comprise one or more kernels, drivers, or other like components configured to provide communication between the servers 102 and one or more of the electronic devices 104, 118.

The data store 216 may store any of the metadata, content, information, or other data utilized in creating one or more content segments 112 and/or digital media messages 114. For example, the data store 216 may store any of the images, video files, audio files, web links, media, or other content that is captured or otherwise received via the electronic device 104. Such content may be, for example, provided to the data store 216 via the network during creation of a content segment 112 and/or a digital media message 114. Alternatively, such content may be provided to the data store 216 prior to generating a content segment 112 and/or a digital media message 114. In such examples, such content may be obtained and/or received from the data store 216 during generation of a content segment 112 and/or a digital media message 114.

In example embodiments, one or more modules of the media message engine 110 described above may be combined or omitted. Additionally, one or more modules of the media message engine 110 may also be included in the media message engine 108 of the electronic device 104. As a result, the example methods and techniques of the present disclosure, such as methods of generating a digital media message, may be performed solely on either the server 102 or one of the electronic devices 104. Alternatively, in further embodiments, methods and techniques of the present disclosure may be performed, at least in part, on both the server 102 and one of the electronic devices 104.

Example Electronic Device

Figure 3:
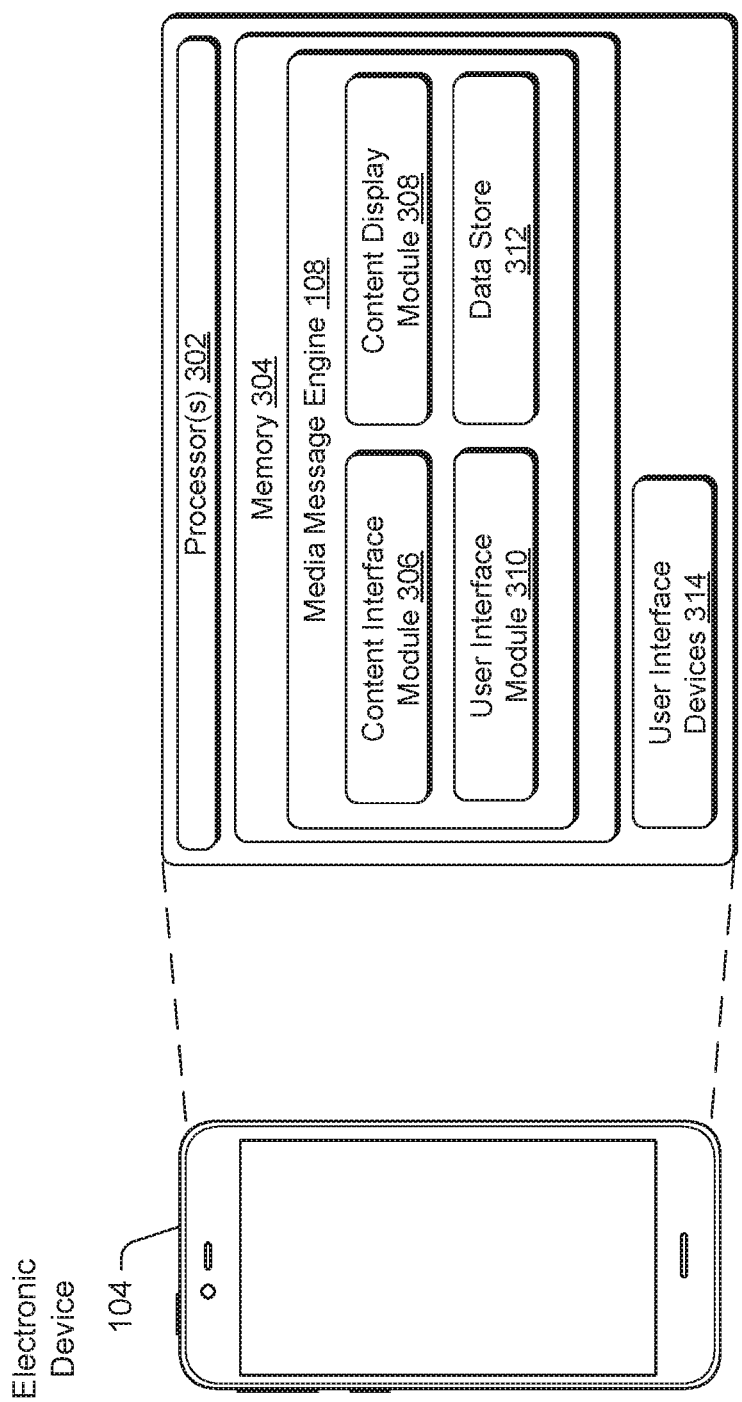
FIG. 3 is a schematic diagram of illustrative components in an example electronic device that may be used in an example digital media message generation environment.

FIG. 3 is a schematic diagram of illustrative components in an example electronic device 104 that is used to prepare and/or consume digital content segments 112 and digital media messages 114. As noted above, the electronic device 104 shown in FIG. 3 may include one or more of the components described above with respect to the server 102 such that digital content segments 112 and/or digital media messages 114 may be created and/or consumed solely on the electronic device 104. Additionally and/or alternatively, the electronic device 104 may include one or inure processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

Similar to the memory 204 of the server 102, the memory 304 of the electronic device 104 may also include a media message engine 110, and the engine 110 may include any of the modules or other components described above with respect to the media message engine 108. Additionally or alternatively, the media message engine 110 of the electronic device 104 may include one or more of a content interface module 306, a content display module 308, a user interface module 310, and a data store 312 similar to the data store 216 described above. The modules may include routines, programs, instructions, objects, and/or data structures that perform particular tasks or implement particular abstract data types. The electronic device 104 may also include one or more cameras, microphones, displays (e.g., a touch screen display), keyboards, mice, touch pads, proximity sensors, capacitance sensors, or other user interface devices 314.

The content interface module 306 may enable the user to request and download content, digital content segments 112, or other information from the server(s) 102 and/or from the Internet. The content interface module 306 may download such content via any wireless or wired communication interfaces, such as Universal Serial Bus (USB), Ethernet, Bluetooth®, Wi-Fi, and/or the like. Additionally, the content interface module 306 may include and/or enable one or more search engines or other applications on the electronic device 104 to enable the user 116 to search for images, video, audio, and/or other content to be included in a digital media message 114.

The content display module 308 may present content, digital content segments 112, digital media messages 114, or other information on a display of the electronic device 104 for viewing. In various embodiments, the content display module 308 may provide functionalities that enable the user 116 to manipulate individual digital content segments 112 or other information as a digital media message 114 is being generated. For example, the content display module 308 may provide editing functionality enabling the user 116 to delete, move, modify, augment, cut, paste, copy, save, or otherwise alter portions of each digital content segment 112 as part of generating a digital media message 114.

Example User Interfaces

Figure 4:
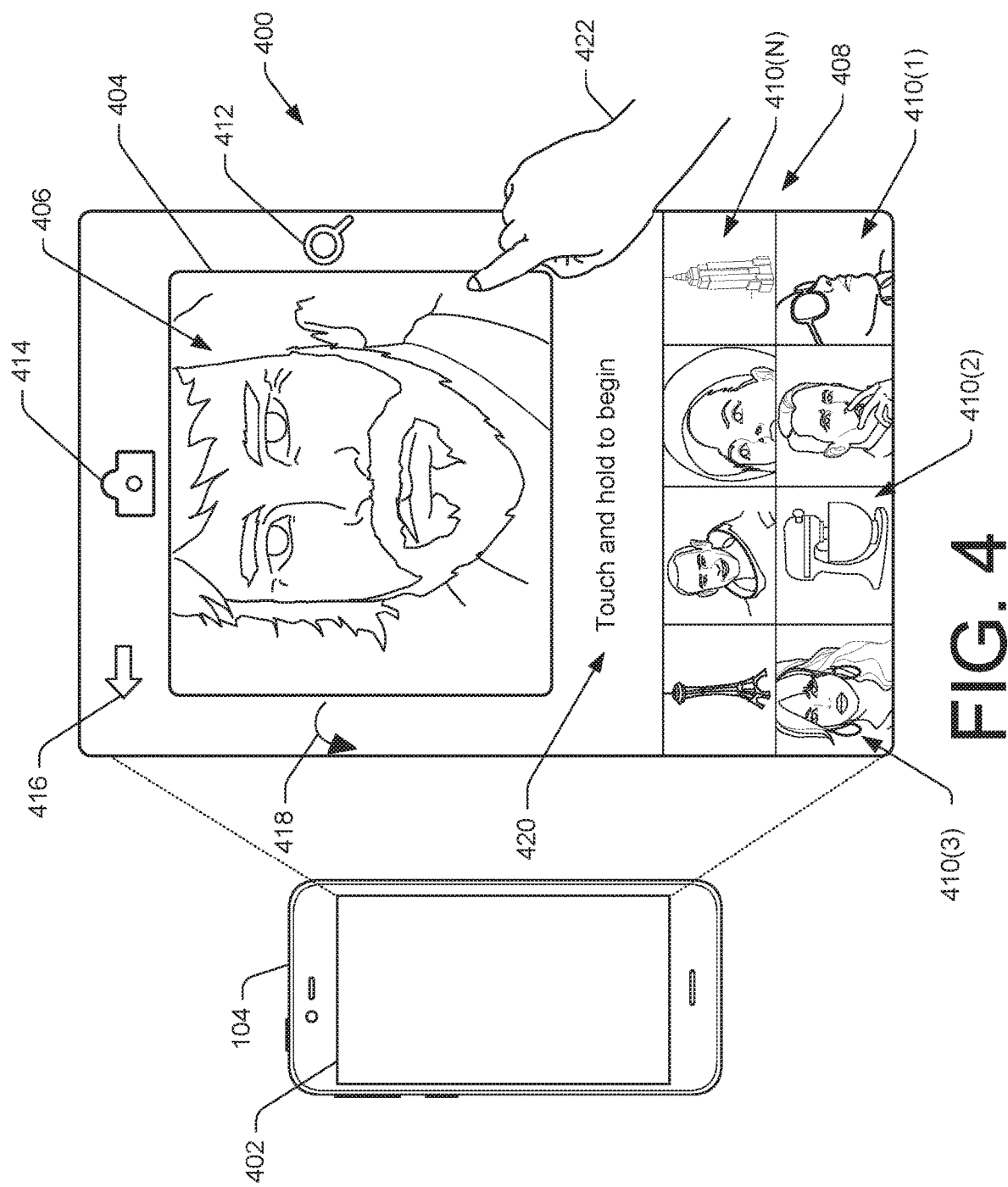
FIG. 4 shows an illustrative user interface screen displayed on an electronic device that enables users to generate a portion of an example digital media message.

FIG. 4 shows an illustrative user interface 400 that enables the user 116 to generate a digital media message 114. For example, the user interface 400 may be displayed on an electronic device 104 that enables users to create, capture, search for, and/or select digital content segments 112, and to generate and/or consume digital media messages 114. The user interface 400 may be displayed, for example, on a display 402 of the electronic device 104. In some examples, the user interface 400 may be a web page that is presented to the user 116 via a web browser on the electronic device 104. Alternatively, the user interface 400 may be an interface generated and provided by the content display module 308 as part of a digital media message generation application operating locally on the electronic device 104. For the duration of this disclosure, example embodiments in which the user interface 400 is generated and provided by the content display module 308 and/or the message generation engine 108 as part of a digital media message generation application operating locally on the electronic device 104 will be described unless otherwise noted.

As shown, the message generation engine 108 may present a user interface 400 that includes a first portion 404 displaying an image 406, and a second portion 408 that includes one or more thumbnails 410(1)-410(N) (collectively "thumbnails 410"). In example embodiments, the image 406 displayed in the first portion 404 may be one or more images, photos, or first frames of a video stored in the memory 304 of the electronic device 104. Alternatively, the content display module 308 may present one or more images 406 in the first portion 404 that are obtained in real time via, for example, a camera or other user interface device 314 of the electronic device 104. For example, the first portion 404 may provide an image 406 of objects that are within a field of view of the camera, and at least the first portion 404 may be receptive to user input such as, for example, touch input, touch and hold input, swipe input, tap input, double tap input, pinch input, and/or other gestures.

As will be described in greater detail below, the message generation engine 108 may receive input from a user of the electronic device 104 via either the first portion 404 or the second portion 408. In some embodiments, such input may comprise one or more gestures such as a touch and hold command within the first portion 404. Receipt of such an input in the first portion 404 may cause the message generation engine 108 to capture and/or otherwise receive a first digital content segment 112 via, for example, the camera or other user interface device 314 of the electronic device 104. In such embodiments, the received digital content segment 112 may be displayed within the first portion 404 as the content segment 112 is being recorded and/or otherwise captured by the camera. The message generation engine 108 may associate the digital content segment 112 with a desired position in a play sequence of a digital media message 114.

Additionally and/or alternatively, the message generation engine 108 may receive input from the user of the electronic device 104 that includes a touch and hold command on one or more of the thumbnails 410 provided in the second portion 408. Receipt of such an input in the second portion 408 may cause the message generation engine 108 to receive a video segment and/or an image associated with the respective thumbnail 410 for inclusion in the digital media message 114. The message generation engine 108 may also associate digital content segments 112 receives by selection of one or more of the thumbnails 410 with the respective desired position in the play sequence of the digital media message 114.

In example embodiments, each of the thumbnails 410 may be representative and/or otherwise indicative of a respective photo, image, and/or video stored in the memory 304. For example, such content may have been captured by a user 116 of the electronic device 104 prior to commencing generation of the digital media message 114. Alternatively, one or more photos, images, videos, and/or other content corresponding to one or more of the thumbnails 410 may be captured during generation of the digital media message 114. Thus, in some embodiments, the second portion 408 may comprise a scrollable thumbnail library including respective thumbnails 410 that may be selected by the user 116 for inclusion in the digital media message 114.

As shown in FIG. 4, the user interface 400 may also include one or more controls configured to assist the user 116 in capturing one or more digital content segments 112, modifying one or more of the digital content segments, and/or generating one or more digital media messages 114. For example, the user interface 400 may include a zoom control 412 configured to enlarge or reduce, for example, the size of the image 406 shown in the first portion 404 and/or to enlarge or reduce the size of the first portion 404 itself. The user interface 400 may also include a user interface device control 414 configured to control one or more operations of a user interface devices 314 of the electronic device 104. For example, the user interface device control 414 may be configured to control activation of one or more cameras of the device 104. In particular, the user interface device control 414 may be configured to select and/or toggle between a first camera of the electronic device 14 on a first side of the electronic device 104 and a second camera on a second side of the electronic device 104 opposite the first side.

The user interface 400 may also include a plurality of additional controls including one or more navigation controls 416 and/or one or more editing controls 418. For example, the user interface 400 may include a navigation control 416 that, upon selection thereof by the user 116, may enable the user to browse backward or forward between different user interfaces 400 while generating a digital media message 114. For example, a first navigation control 416 may comprise a "back" control while a second navigation control 416 may comprise a "forward" control.

Additionally, one or more of the editing controls 418 may enable a user 116 to add, remove, cut, paste, draw, rotate, flip, shade, color, fade, darken, and/or otherwise modify various aspects of the digital media message 114 and/or various digital content segments 112. For example, one or more of the editing controls 418 may comprise an "undo" control that enables the user 116 to delete and/or otherwise remove one or more digital content segments 112 from a play sequence of the digital media message 114. Although a variety of different controls have been described above with regard to the user interface 400, it is understood that in further example embodiments one or more additional controls may be presented to the user 116 by the media message engine 108. For example, such editing controls 418 may further comprise any audio, video, image, or other editing tools known in the art. In some examples, at least one of the controls described herein may be configured to modify a first digital content segment 112 before a second, third, or other additional digital content segment 112 is received by the media message engine 108.

The user interface 400 may also include a message bar 420 configured to provide guidance to the user 116 before, during, and/or after generation of the digital media message 114. For example, the message bar 420 may provide instructions to the user 116 and/or other guidance related to use of one or more of the controls described above, next steps to be taken in order to generate the digital media message 114, the completion status of the digital media message 114, and/or other information. As shown in FIG. 4, in example embodiments the message bar 420 may be disposed between the first portion 404 and the second portion 408. Alternatively, in further example embodiments the message bar 420 may be disposed above the first portion 404, below the second portion 408, and/or at any other position on the user interface 400. In an example embodiment, the message bar 420 may instruct the user 116 to touch and hold, for example, the first portion 404 or the second portion 408 in order to begin generating a digital media message 114.

Figure 5:
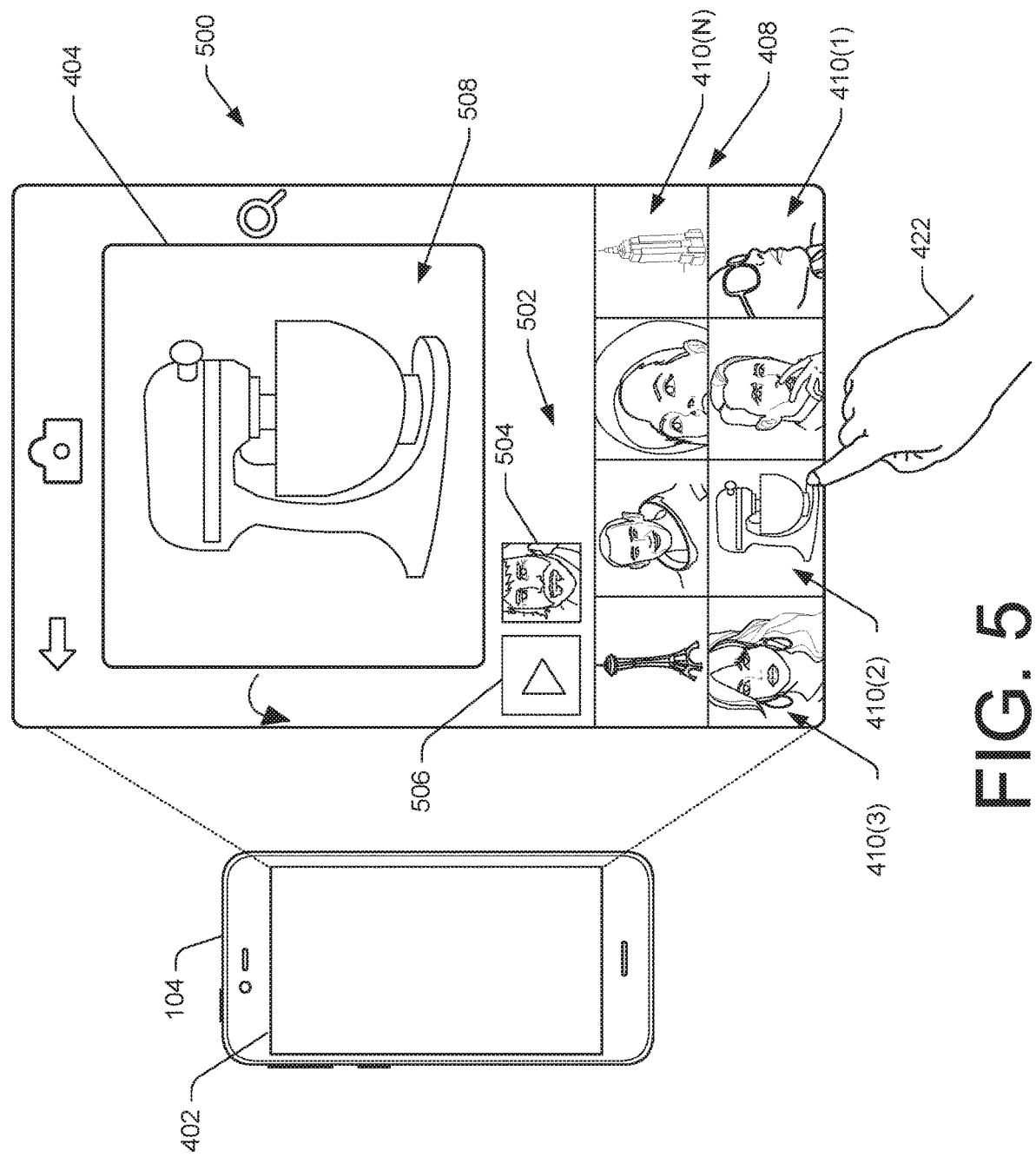
FIG. 5 shows another illustrative user interface screen displayed on an electronic device that enables users to generate a portion of an example digital media message.

FIG. 5 illustrates another example user interface 500 of the present disclosure. In example embodiments, the media message engine 108 may provide such an example user interface 500 during the process of generating a digital media message 114 and, for example, after at least one digital content segment 112 has been received by the media message engine 108 via the electronic device 104. For example, the user interface 500 may include visual indicia of a play sequence 502 associated with the digital media message 114 that is currently being generated. Such visual indicia may include a first portion corresponding to a first digital content segment 112 received by the media message engine 108, and at least one additional portion corresponding to a respective additional digital content segment 112 received by the media message engine 108.

In some examples, the visual indicia of the play sequence 502 may include one or more thumbnails 504 illustrating and/or otherwise indicative of respective digital content segments 112 that have previously been added to and/or otherwise associated with the digital media message 114. In example embodiments, the visual indicia of the play sequence 502 may include various thumbnails 504 provided in the sequential order in which each respective content segment 112 has been received by the media message engine 108. For example, digital content segments 112 received earlier in time during the generation of a digital media message 114 may be represented by respective thumbnails 504 disposed further to the left-hand side of the display 402 than additional thumbnails 504 representing respective digital content segments 112 received relatively later in time. Further, in example embodiments each respective thumbnail 504 may illustrate one or more scenes from a video, a representation of a photo or image, and/or any other visual representation of the respective digital content segment 112 to which the thumbnail 504 corresponds. In this way, the thumbnails 504 provided as part of the visual indicia of the play sequence 502 may assist the user 116 in recalling the content and/or general flow of the digital media message 114 during creation thereof. The example thumbnail 504 illustrated in FIG. 5 is representative of, for example, the image 406 described above with respect to FIG. 4. In such an example, a video, photo, image, or other such content associated with a digital content segment 112 received via the user interface 400 of FIG. 4 may, for example, be associated with a first position in the play sequence associated with the user interface 500 of FIG. 5.

The user interface 500 may also include one or more controls associated with the visual indicia of the play sequence 502. For example, such controls may include a play control 506. In example embodiments, the play control 506 may be configured to play, display, and/or otherwise provide a preview of the digital media message 114 to the user via, for example, the first portion 404 of the display 402. In such embodiments, the media message engine 108 may play one or more portions of the digital media message 114 currently being generated in response to receiving a touch input and/or other input via the play control 506. In some embodiments, further functionality may be provided to the user 116 via the play control 506 and/or via one or more additional controls associated with the play control 506.

For example, the play control 506 and/or other associated controls may enable the user 116 to increase or decrease the speed at which the preview of the digital media message 114 is provided. The play control 506 and/or other associated controls may also enable the user 116 to skip between multiple digital content segments 112 associated with the corresponding play sequence. Additionally, the play control 506 and/or other associated controls may enable the user 116 to pause the preview of the digital media message 114. In examples in which such functionality is provided via the play control 506, such functionality may be accessed via multiple taps, multiple touches, or other gestures such as swipe gestures, and the like received via the first portion 404. Alternatively, in examples in which such functionality is provided via one or more additional play controls, such additional play controls may be rendered, displayed, and/or otherwise provided via the display 402 at a location, for example, proximate the play control 506.

As shown in FIG. 5, in some examples the media message engine 108 may provide an image 508 to the user 116 via the first portion 404. In such examples, the image 508 may correspond to one or more of the thumbnails 410 shown in the second portion 408. For example, in some embodiments the user 116 may select a thumbnail 410 of the second portion 408 by touching and/or holding the desired thumbnail 410 with the hand 422 of the user 116. When such a thumbnail 410 is selected in this way, an image 508 corresponding to the selected thumbnail 410 may be displayed in the first portion 404. For example, the media message engine 108 may receive at least one digital content segment 112 in response to selection of one or more such thumbnails 410 by the user 116. In example embodiments, when one or more of the thumbnails 410 is selected in this way, the media message engine 108 may not only receive a first digital content segment 112 comprising a photo, video, image, and/or other content corresponding to the selected thumbnail 410, but may also receive a different additional content segment 112 while the surface and/or portion of the display 402 corresponding to the thumbnail 410 is contacted by the hand 422 of the user 116.

For example, in such embodiments the additional digital content segment 112 may comprise audio or other like input captured by a microphone or other user interface device 314 of the electronic device 104 while the surface and/or portion of the display 402 corresponding to the thumbnail 410 is contacted by the hand 422 of the user 116. In such embodiments, both of the respective digital content segments may be added to the play sequence of the digital media message 114 such that the respective digital content segments 112 are presented simultaneously when the digital media message 114 is played. As shown in FIG. 5, the image 508 may correspond to the thumbnail 410(2) currently being contacted by the hand 422 of the user 116.

Figure 6:
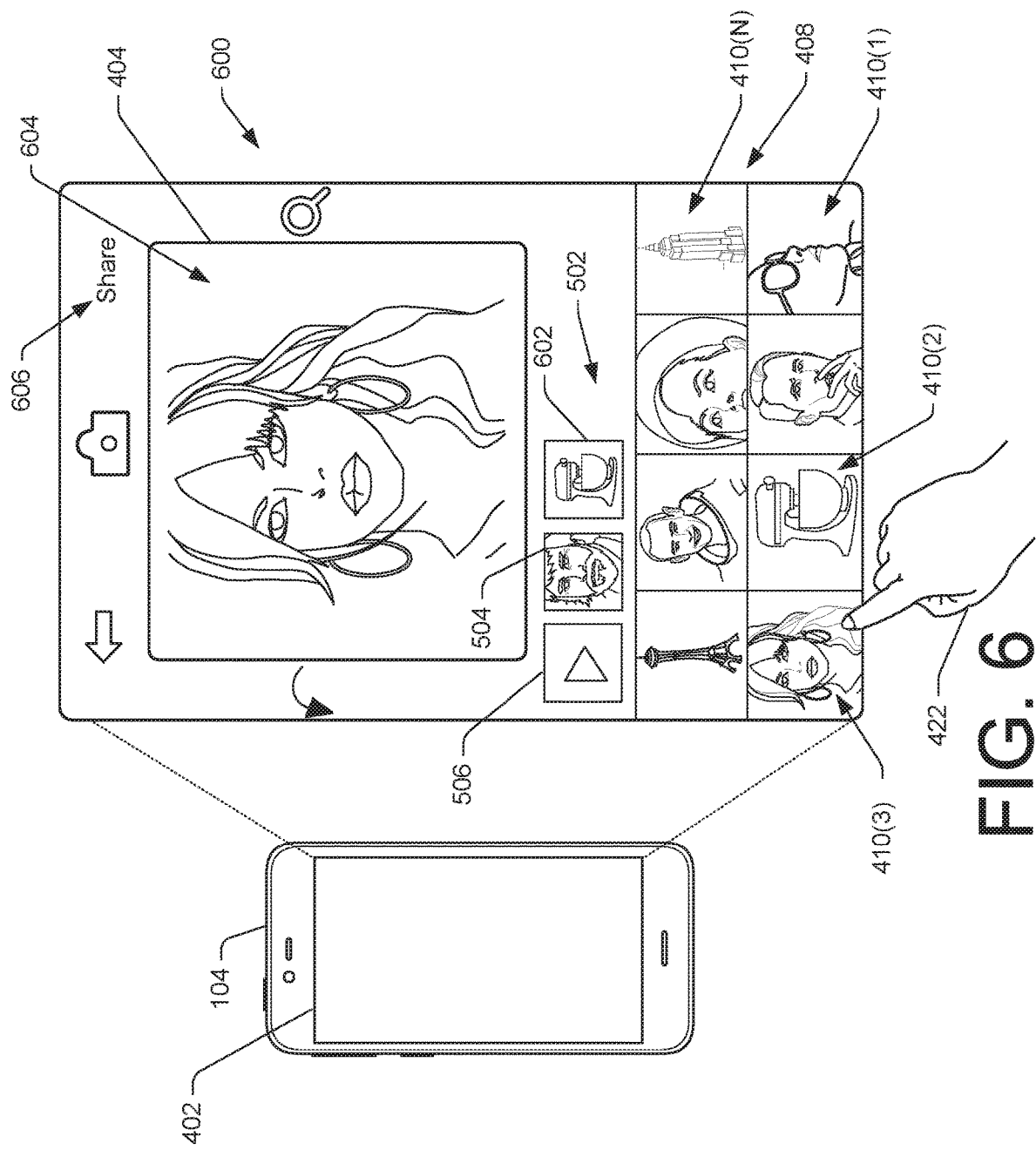
FIG. 6 shows still another illustrative user interface screen displayed on an electronic device that enables users to generate a portion of an example digital media message.

FIG. 6 illustrates a further user interface 600 provided by the media message engine 108. In example embodiments, the media message engine 108 may provide such an example user interface 600 during the process of generating a digital media message 114 and, for example, after a plurality of digital content segments 112 have been received by the media message engine 108 via the electronic device 104. For example, the user interface 600 may include visual indicia of the play sequence 502 that includes the thumbnail 504 described above with respect to FIG. 5, as well as a thumbnail 602 illustrating and/or otherwise indicative of a digital content segment 112 associated with the image 508 described above with respect to FIG. 5.

As noted above, the various thumbnails 504, 602 included in the visual indicia of the play sequence 502 may be provided in the sequential order in which each respective content segment 112 has been received by the media message engine 108. For example, the thumbnail 504 is disposed further to the left-hand side of the display 402 than the thumbnail 602, thereby indicating that a digital content segments 112 corresponding to the thumbnail 504 was received earlier in time than a digital content segment 112 corresponding to the thumbnail 602.

As shown in FIG. 6, in some examples the media message engine 108 may provide an image 604 to the user 116 via the first portion 404. In such examples, the image 604 may correspond to one or more of the thumbnails 410 shown in the second portion 408. For example, in the embodiment of FIG. 6 the user 116 may select a thumbnail 410(3) of the second portion 408 by touching and/or holding a section and/or surface of the display 402 associated with the desired thumbnail 410(3). As described above with respect to FIG. 5, when such a thumbnail 410(3) is selected by the user 116 in this way, the image 604 corresponding to the selected thumbnail 410(3) may be displayed in the first portion 404.

For example, the media message engine 108 may receive at least one digital content segment 112 in response to selection of one or more such thumbnails 410(3) by the user 116. In example embodiments, when the thumbnails 410(3) is selected in this way, the media message engine 108 may not only receive a first digital content segment 112 comprising a photo, video, image, and/or other content corresponding to the selected thumbnail 410(3), but may also receive a different second content segment 112 while the surface and/or portion of the display 402 corresponding to the thumbnail 410(3) is contacted by the hand 422 of the user 116. For example, in such embodiments the second digital content segment 112 may comprise audio or other like input captured by a microphone or other user interface device 314 of the electronic device 104 while the surface and/or portion of the display 402 corresponding to the thumbnail 410(3) is contacted by the hand 422 of the user 116. In such embodiments, receiving such first and second content segments 112 may cause, for example, the media message engine 108 or other components of the electronic device 104 to store at least one of the first and second content segments 112 in the memory 304 and/or in the memory 204 of the server 102. In some embodiments, the first digital content segment 112 may be stored separately from the second digital content segment 112. Additionally, the first and second digital content segments 112 may be added to the play sequence of the digital media message 114 such that the respective digital content segments 112 are presented simultaneously when the digital media message 114 is played.

In particular, in example embodiments in which the first digital content segment 112 comprises a photo, video, image, audio, and/or other content corresponding to the selected thumbnail 410(3), and a second digital content segment 112 comprises an audio segment, a video segment, or other like input captured by a user interface device 314 of the electronic device 104 while the surface and/or portion of the display 402 corresponding to the thumbnail 410(3) is contacted by the hand 422, the media message engine 108 may combine such first and second digital content segments 112. By combining such digital content segments, the second digital content segment 112 (an audio segment or a video segment) may be presented simultaneously with the first digital content segment 112 (e.g., a photo, video, image, audio, or other content) when the digital media message 114 is played. Combining digital content segments 112 in this way may include generating a combined segment that is configured such that, for example, audio from the second content segment 112 described above is presented simultaneously with at least one of a photo, video, image, audio, or other content of the first content segment 112 when a portion of the digital media message 114 corresponding to the combined segment is played. In such examples, the media message engine 108 may associate the combined segment with any position in the play sequence desired by the user 116.

Further, the user interface 600 may also include one or more controls configured to enable the user 116 to share the digital media message 114 with other users, such as users 120 of remote electronic devices 118. For example, the user interface 600 may include one or more share controls 606. In example embodiments, when one or more such share controls 606 is actuated by the user 116, the media message engine 108 may provide, such as via the display 402, a plurality of additional controls configured to assist the user 116 in providing the digital media message 114 for sharing with a remote electronic device 118. Such additional controls will be described in greater detail below.

Figure 7:
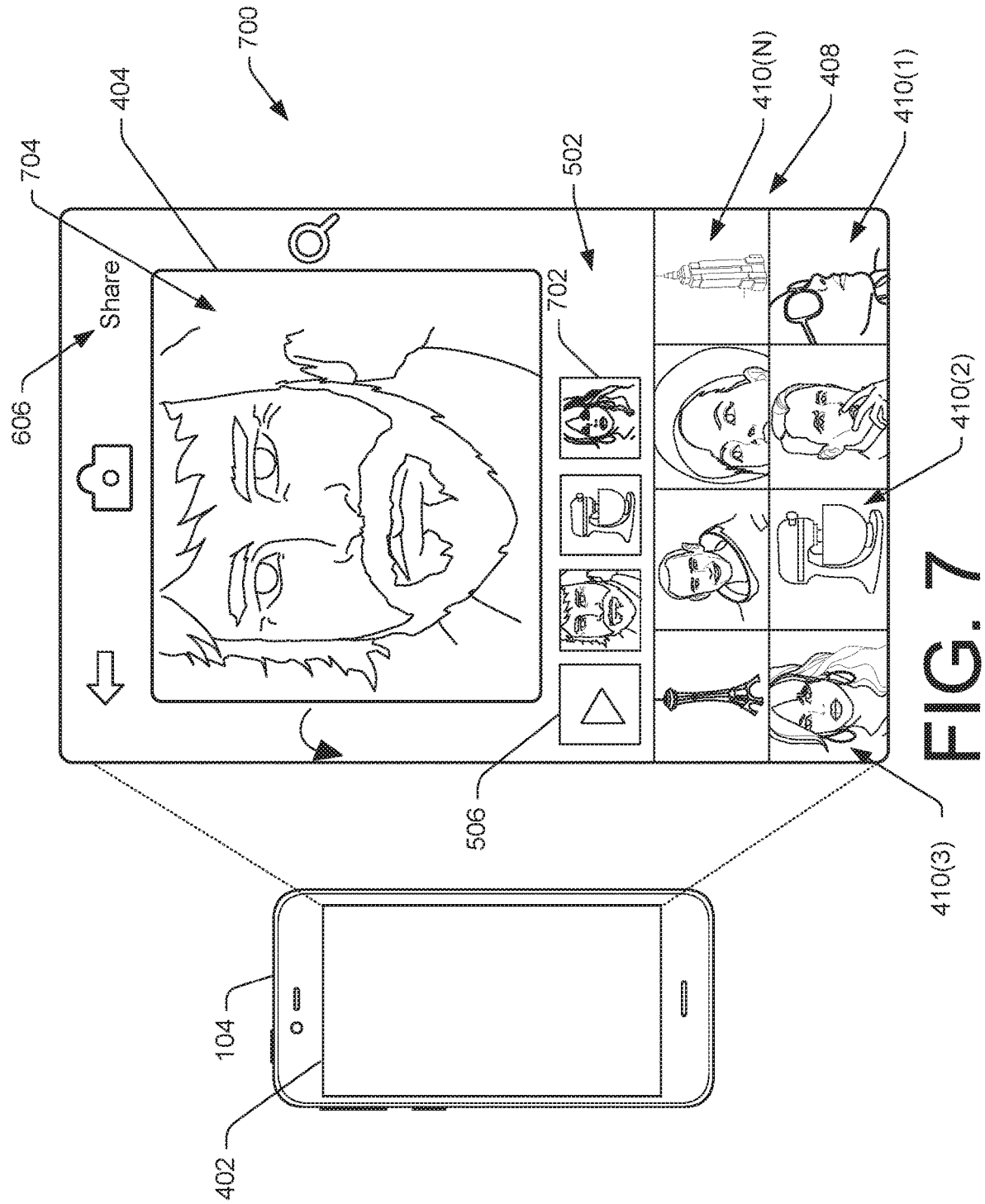
FIG. 7 shows yet another illustrative user interface screen displayed on an electronic device that enables users to generate a portion of an example digital media message.

FIG. 7 illustrates yet another example user interface 700 of the present disclosure. In example embodiments, the media message engine 108 may provide such an example user interface 700 during the process of generating a digital media message 114 and, for example, after a final digital content segment 112 has been received by the media message engine 108 via the electronic device 104. For example, the user interface 700 may include visual indicia of the play sequence 502 that includes the thumbnails described above with respect to FIGS. 5 and 6, as well as a thumbnail 702 illustrating and/or otherwise indicative of a digital content segment 112 associated with the image 604.

The user interface 700 may also include an image 704, and the image 704 may be one or more images, photos, or first frames of a video stored in the memory 304 of the electronic device 104. Alternatively, the content display module 308 may present one or more images 704 in the first portion 404 that are obtained in real time via, for example, a camera or other user interface device 314 of the electronic device 104. For example, the first portion 404 may provide an image 704 of objects that are within a field of view of the camera.

Figure 8:
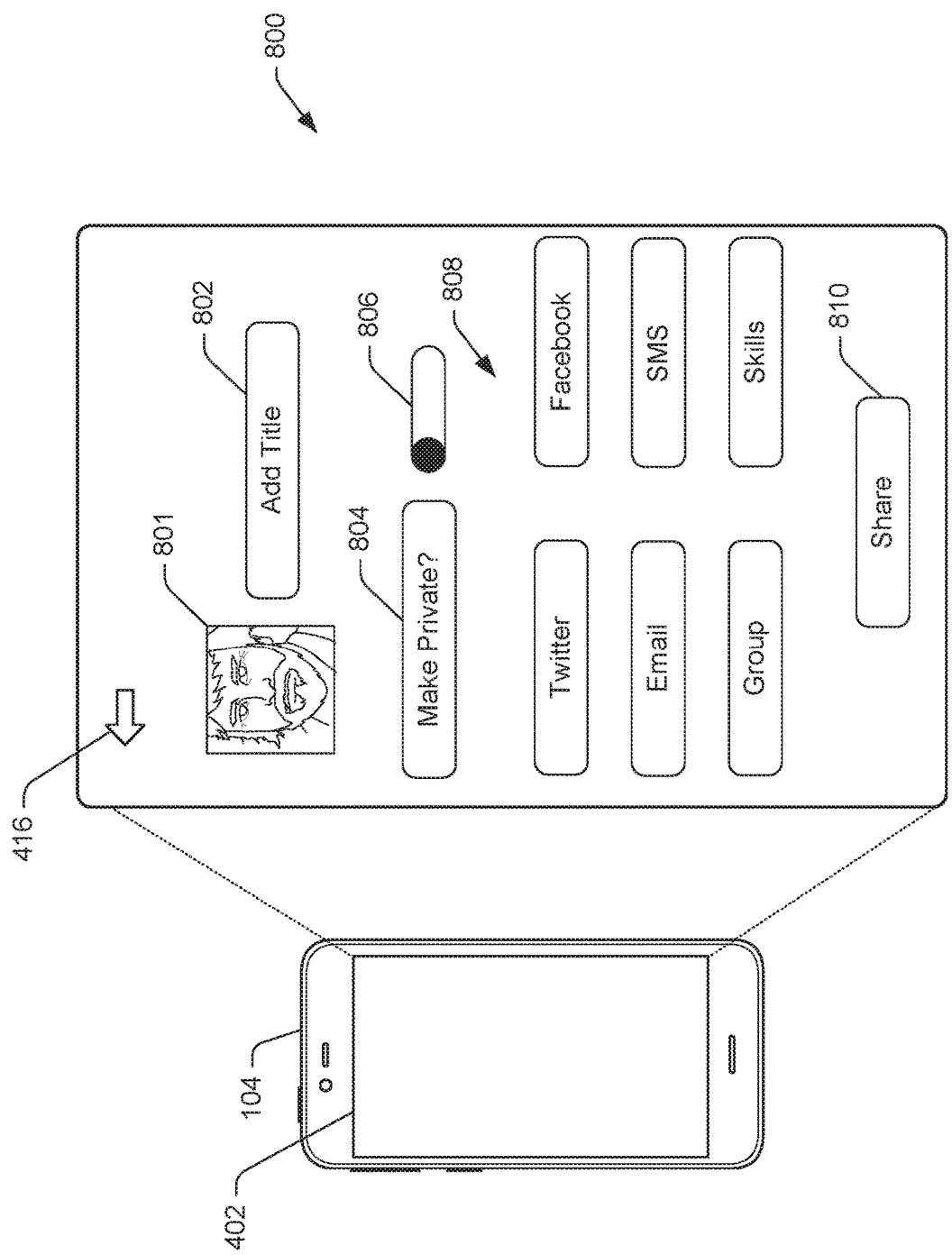
FIG. 8 shows an illustrative user interface screen displayed on an electronic device that enables users to share an example digital media message.

In some embodiments, the media message engine 108 may receive an input, such as a touch input, indicative of selection of the control 606 by the user 116. In response to receiving such an input, the media message engine 108 may provide the example user interface 800 illustrated in FIG. 8. Such an example user interface 800 may include, among other things, a message thumbnail 801 indicating and/or otherwise identifying the digital media message 114 that the user 116 desires to share. In example embodiments, such a message thumbnail 801 may be similar to one or more of the thumbnails 504, 602, 702 described above. In some examples, however, the message thumbnail 801 may be larger than one or more of the thumbnails 504, 602, 702, and/or may have one or more visual characteristics (e.g., highlighting, shading, a label, a frame, etc.) configured to make it easier for the user 116 to distinguish the message thumbnail 801 from one or more of the thumbnails 504, 602, 702. In example embodiments, the message thumbnail 801 may comprise, for example, a first frame and/or any other image or content indicative of the digital media message 114 being generated by the user 116.

Such an example user interface 800 may also include a plurality of controls configured to assist the user 116 in providing the digital media message 114 for sharing with, for example, a remote electronic device 118, such as via the network 106. For example, one or more of the controls 802 may enable the user 116 to add a title, a name, and/or other identifier to the media message 114 such that the media message 114 may be easily recognizable and/or identifiable by one or more users 120 of the remote electronic device 118. In some examples, the title and/or other identifier added to the media message 114 may be provided to the user 120 simultaneously and/or otherwise in conjunction with the digital media message 114 when the user 120 consumes at least a portion of the digital media message 114 on the remote electronic device 118.

In addition, the user interface 800 may include one or more controls 804, 806 configured to enable the user 116 to privatize the digital media message 114 prior to providing the digital media message 114 for sharing with a remote electronic device 118. For example, one or more such controls 804 may enable the user 116 to encrypt and/or otherwise configure the digital media message 114 such that only an approved user 120 or plurality of users 120 may receive and/or access the digital media message 114. In example embodiments, the media message engine 108 may receive an input, such as a touch input, indicative of selection of the control 804 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts approved by the user 116 to have access to the digital media message 114. Additionally or alternatively, in response to receiving such an input, the media message engine 108 may enable the user 116 to password protect and/or otherwise encrypt the digital media message 114 prior to sharing. In any of the example embodiments described herein, one or more of the controls 806 may comprise a slide bar and/or other like icon indicating whether the user 116 has privatized the digital media message 114. For example, such a control 806 may change color, transition between a "no" indication and a "yes" indication, and/or may otherwise provide a visual indication of the privacy status/level of the digital media message 114.

The user interface 800 may also include one or more controls 808 configured to enable the user 116 to select one or more means of providing the digital media message 114 for sharing with a remote electronic device 118. For example, one or more such controls 808 may enable the user 116 to select from a plurality of common social media websites and/or other portals useful in sharing the digital media message 114. In such example embodiments, the media message engine 108 may receive an input, such as a touch input, indicative of selection of the control 808 by the user 116. In response to receiving such an input, the media message engine 108 may enable the user 116 to access an existing account on the selected social media portal. Once such an account has been accessed, the media message engine 108 may provide the digital media message 114 to the selected social media portal for sharing with remote users 120 via the selected portal.

One or more such controls 808 may also enable the user 116 to select between email, text messaging (SMS), instant messaging, and/or other like means for sharing the digital media message 114. In such example embodiments, the media message engine 108 may receive input, such as a touch input, indicative of selection of the control 808 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts with which the user 116 desires to share the digital media message 114. Upon selecting such contacts, the user 116 may provide the digital media message 114 to the selected users by providing an input, such as a touch input, indicative of selection of a share control 810.

Illustrative Methods

Figure 9:
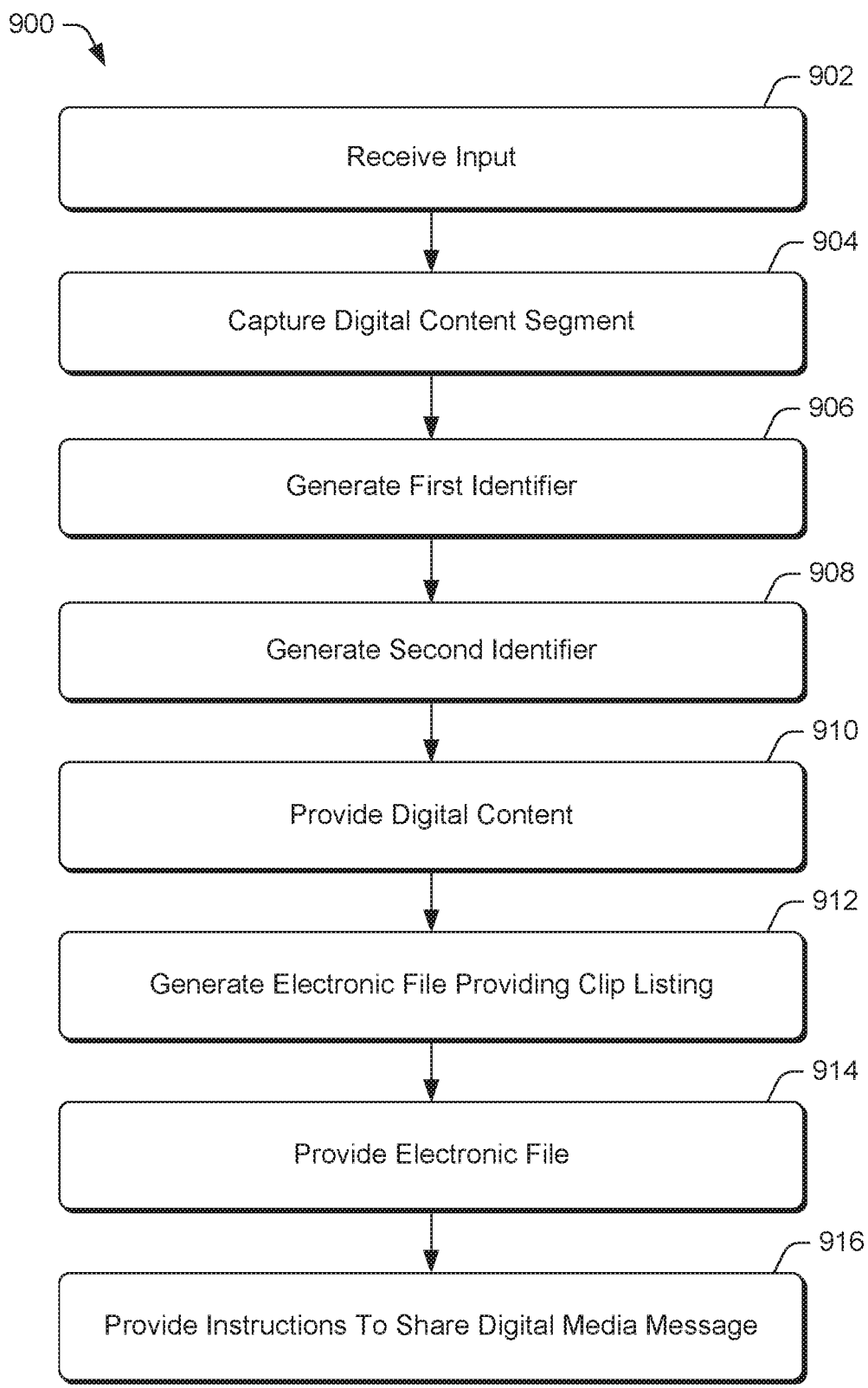
FIG. 9 is a flow diagram illustrating an example method of the present disclosure.

FIG. 9 shows an example method 900 associated with generating and sharing a digital media message 114. The example method 900 is illustrated as a collection of steps in a logical flow diagram, which represents operations that can be implemented in hardware, software, or a combination thereof. In the context of software, the steps represent computer-executable instructions stored in memory. When such instructions are executed by one or more processors, such instructions may cause the processor, various components of the electronic device, and/or the electronic device, generally, to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 900 is described with reference to the environment 100 of FIG. 1.

Figure 10:
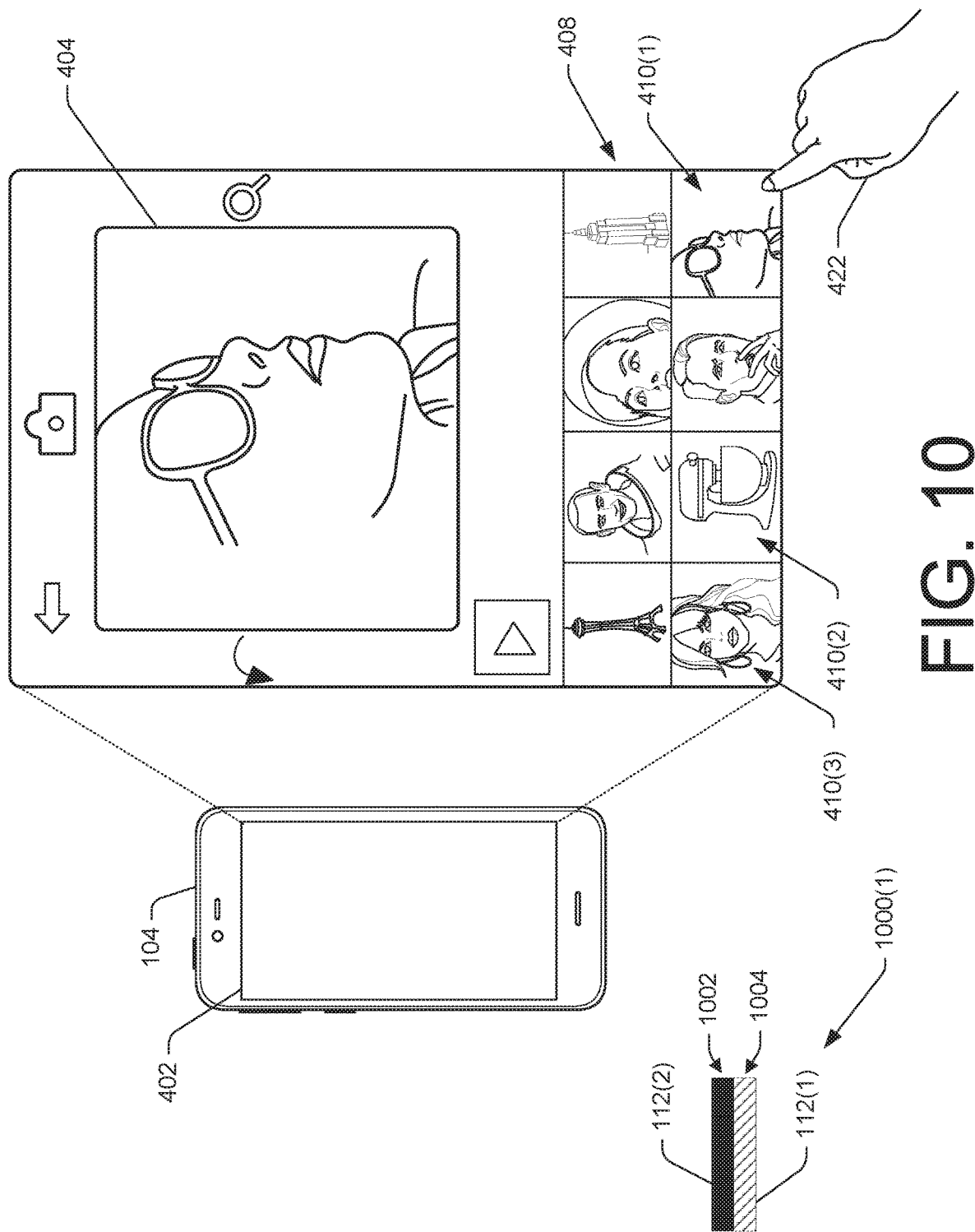
FIG. 10 shows an illustrative user interface screen displayed on an electronic device, as well as example audio and video tracks.

At block 902, the electronic device 104 may receive an input from the user 116 of the electronic device 104. In some examples, such an input may be a touch input, a touch and hold input, a swipe, a drag, a voice command, and/or any other input described herein. For example, at block 902 the media message engine 108 may receive a touch and hold input via the touch-sensitive display 402 of the electronic device 104. In such embodiments, the input received at block 902 may indicate selection of and/or may otherwise correspond to an image, a video, an audio segment, and/or any other digital content segment 112(1) stored in the memory 304 of the electronic device 104 and/or in the memory 204 of the server computer 102. For example, as described above with respect to at least FIGS. 4-7, and as further illustrated by FIGS. 10 and 11, in some examples the electronic device 104 may display a plurality of thumbnails 410 on the display 402. In such examples, the user 116 may provide a touch and hold input via one or more of the thumbnails 410 (e.g., thumbnail 410(1), as shown in FIG. 10), and such an input may indicate that the user 116 has selected the digital image corresponding to the particular thumbnail 410(1) for inclusion in a digital media message 114. In such examples, the selected digital image (e.g., a first digital content segment 112(1)) may be stored in the memory 304 of the electronic device 104 and/or in the memory 204, and visual indicia of a play sequence 502 associated with the digital media message 114 being generated may be displayed on the display 402. Further, the input described with respect to block 902 may be received via the location on the display 402 at which the thumbnail 410(1) is being displayed.

In some embodiments, receiving the input at block 902 may cause the electronic device 104 to capture a video segment, audio segment, photo, digital image, or other such digital content segment (e.g., a second digital content segment 112(2)) using one or more of the user interface devices 314. For example, at block 904, the processor 302 may cause a microphone, digital camera, and/or other user interface 314 of the electronic device 104 to capture a digital content segment 112(2) in response to the input received at block 902. In such an example, the media message engine 108 may cause the captured digital content segment 112(2) to be stored in the memory 304 and/or the memory 204 of the server 102 for future use. Examples in which at least one of the digital content segments 112(1), 112(2) are transferred to the server 102 for storage in the memory 204 will be described below with respect to block 910. It is understood, however, that in still further example embodiments, each digital content segment 112 used to generate the digital media message 114 may be stored in the memory 204 of the server 102. In such examples, the first and second digital content segments 112(1), 112(2) may not be provided to the server computer 102 at block 904. Instead, the user 116 of the electronic device 104 may access the first and second digital content segments 112(1), 112(2) on the server 102, via the network 106, and may select one or more of the digital content segments 112(1), 112(2) for use in generating the digital media message 114 using the electronic device 104.

Figure 11:
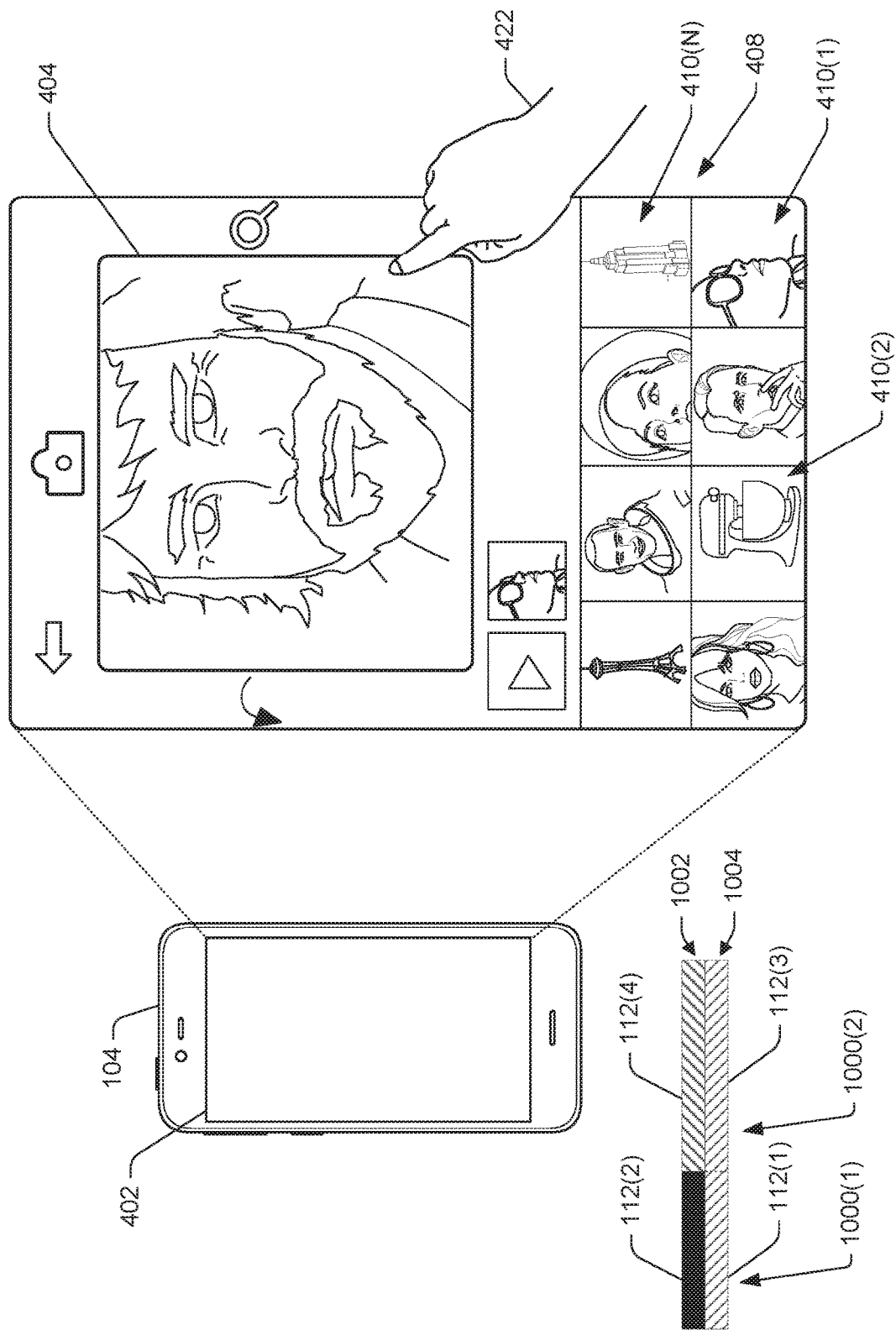
FIG. 11 shows another illustrative user interface screen displayed on an electronic device, as well as example audio and video tracks.

As shown schematically in FIGS. 10 and 11, the first and second digital content segments 112(1), 112(2) may comprise respective portions of a clip of the digital media message 114 being generated. In particular, the digital media message 114 may comprise one or more clips 1000(1), 1000(2), . . . 1000(N) (collectively, "clips 1000"), and each clip 1000 of the digital media message 114 may comprise one of more frames. Further, as shown in FIGS. 10 and 11, the digital media message 114 may comprise an audio track 1002 and a corresponding video track 1004. Thus, in such embodiments, each clip 1000 may make up a respective sequential portion of the audio and video tracks 1002, 1004. In the example shown in FIG. 10, in the first clip 1000(1) of the digital media message 114, the digital content segment 112(1) (e.g., a digital image) may make up each frame of the video track 1004 and the corresponding digital content segment 112(2) (e.g., an audio segment) may make up each frame of the audio track 1002. It is understood that using the digital image 112(1) to make up each frame of a video track 1004 may reduce the device and/or server memory required for storing the video track 1004, the network bandwidth required to transfer the video track 1004, and/or other device resource requirements relative to comparable video tracks 1004 comprising actual video footage. As a result, using the digital image 112(1) to make up each frame of the video track 1004 may reduce the overall size of the resulting digital media message 114, thus reducing the network bandwidth required to transfer the digital media message 114 and reducing the memory, processor resources, and/or other server or device resources needed to render the digital media message 114.

As illustrated in FIG. 11, in example embodiments in which a digital media message 114 comprises more than one clip (e.g., first and second clips 1000(1), 1000(2)), the various clips 1000 may comprise any of a variety of formats. For example, such clips 1000 may be made from audio segments, video segments, digital images, and/or any of the other types of digital content segments 112 described herein. In the example shown in FIG. 11, the digital media message 114 being created comprises a first clip 1000(1) in which the audio track 1002 comprises an audio segment 112(2) and in which the video track 1004 comprises a digital image segment 112(1). The digital media message 114 also includes a second clip 1000(2) comprising a digital video. In such examples, the video track 1004 of the digital media message 114 corresponding to the second clip 1000(2) may comprise a video segment 112(3) of the digital video, and the audio track 1002 of the digital media message 114 corresponding to the second clip 1000(2) may comprise an audio segment 112(4) of the digital video.

At block 906, the electronic device 104 may generate an identifier that is unique to the digital content segment 112(1) described above with respect to block 902. For example, the media message engine 108 may cause the processor 302 and/or other components of the electronic device 104 to generate a unique series of numbers, letters, symbols, and/or other identifiers. In some examples, the identifier generated at block 906 may be randomly generated by the media message engine 108, and/or other components of the electronic device 104. Additionally, at block 906, the electronic device 104 may link, couple, attach, and/or otherwise associate the identifier with the digital content segment 112(1) in the memory 304. For example, in embodiments in which the digital content segment 112(1) comprises a digital file, the media message engine 108 and/or the processor 302 may attach, save, embed, and/or otherwise associate the identifier with the digital content segment 112(1) such that the identifier becomes part of, integrated with, and/or is otherwise carried with the digital content segment 112(1). In some examples, the identifier generated at block 906 may comprise a label and/or other like moniker by which one or more components of the computing environment 100 may identify the digital content segment 112(1).

At block 908, the electronic device 104 may generate an identifier that is unique to the digital content segment 112(2) described above with respect to block 904. For example, the media message engine 108 may cause the processor 302 and/or other components of the electronic device 104 to generate a unique series of numbers, letters, symbols, and/or other identifiers. Additionally, at block 908, the electronic device 104 may link, couple, attach, and/or otherwise associate the identifier generated at block 908 with the digital content segment 112(2). The processes and/or operations performed by the media message engine 108, the processor 302, and/or other components of the electronic device 104 at block 908 with respect to the digital content segment 112(2) may be similar to and/or the same as the processes and/or operations described above with respect to block 906.

At block 910, the electronic device 104 may provide one or more of the digital content segments 112(1), 112(2) described herein to the server computer 102 via the network 106. For example, at block 910 the media message engine 108 may cause the processor 302, and/or one or more communication interfaces or other like hardware and/or software devices or components of the electronic device 104 to transfer at least one of the digital content segments 112(1), 112(2) from the electronic device 104 to the server computer 102. In such examples, it is understood that the identifier described above with respect to block 906 may be transferred in association with the digital content segment 112(1) (e.g., the digital image) if the digital content segment 112(1) is transferred by the electronic device 104 at block 910. Additionally, the identifier described above with respect to block 908 may be transferred in association with the digital content segment 112(2) (e.g., the audio segment) if the digital content segment 112(2) is transferred by the electronic device 104 at block 910. In some examples, at least one of the digital content segments 112(1), 112(2) may be transferred by the electronic device 104 to the server computer 102 substantially in real time at block 910. For example, in embodiments in which the digital content segment 112(2) captured at block 904 comprises an audio segment, a video segment, or other like digital segment, the electronic device 104 may begin transferring and/or otherwise transfer such a digital content segment 112 to the server computer 102 as the digital content segment 112 is being captured.

In some examples, digital content segments 112 transferred to the server computer 102 by electronic device 104 may be stored in the memory 204 and, over time, may form a global repository of digital content by which the various digital media messages 114 described herein may be formed. In such examples, the server computer 102 may protect against storing multiple copies of the same digital content segments 112. In the memory 204. For example, digital content segments 112 comprising audio segments, video segments, and the like may typically be unique due to the nature in which such digital content segments 112 are created at the user level. Digital content segments 112 comprising digital images, on the other hand, have a greater tendency to be duplicates (e.g., stored locally on multiple electronic devices 104, 118 and/or selected for use in a digital media message 114 by multiple different users through web-based searches) since users tend to utilize the same clipart, publicly available images, and/or other digital images when generating digital media messages 114. As a result, in some embodiments the server computer 102 may compare the respective unique identifier associated with the one or more digital content segments 112 (generated at blocks 906 and 908) to a plurality of identifiers stored in the memory 304. In some examples, the electronic device 104 may provide the respective unique identifiers to the server computer 102 at block 910 before providing the one or more digital content segments 112 at block 910. Alternatively, the electronic device 104 may provide the respective unique identifiers to the server computer 102 at block 910 along with the transferred digital content segments 112. In any of the examples described herein, the server computer 102 may accept the digital content segment 112 for storage in the memory 304 if no match is found between the unique identifier associated with the received digital content segment 112 and the plurality of identifiers stored in the memory 304. On the other hand, if the server computer 102 finds a match between the unique identifier associated with the received digital content segment 112 and an identifier of the plurality of identifiers stored in the memory 304, the server computer may deny and/or otherwise prohibit storage of the corresponding digital content segment 112 in the 304 based on such a comparison and/or the resulting match. In examples in which the electronic device 104 provides the respective unique identifiers to the server computer 102 at block 910 before providing the one or more digital content segments 112, the digital content segment 112 corresponding to the matched unique identifier may not be sent to the server computer 102 based on and/or as a result of finding such a match.

Figure 12:
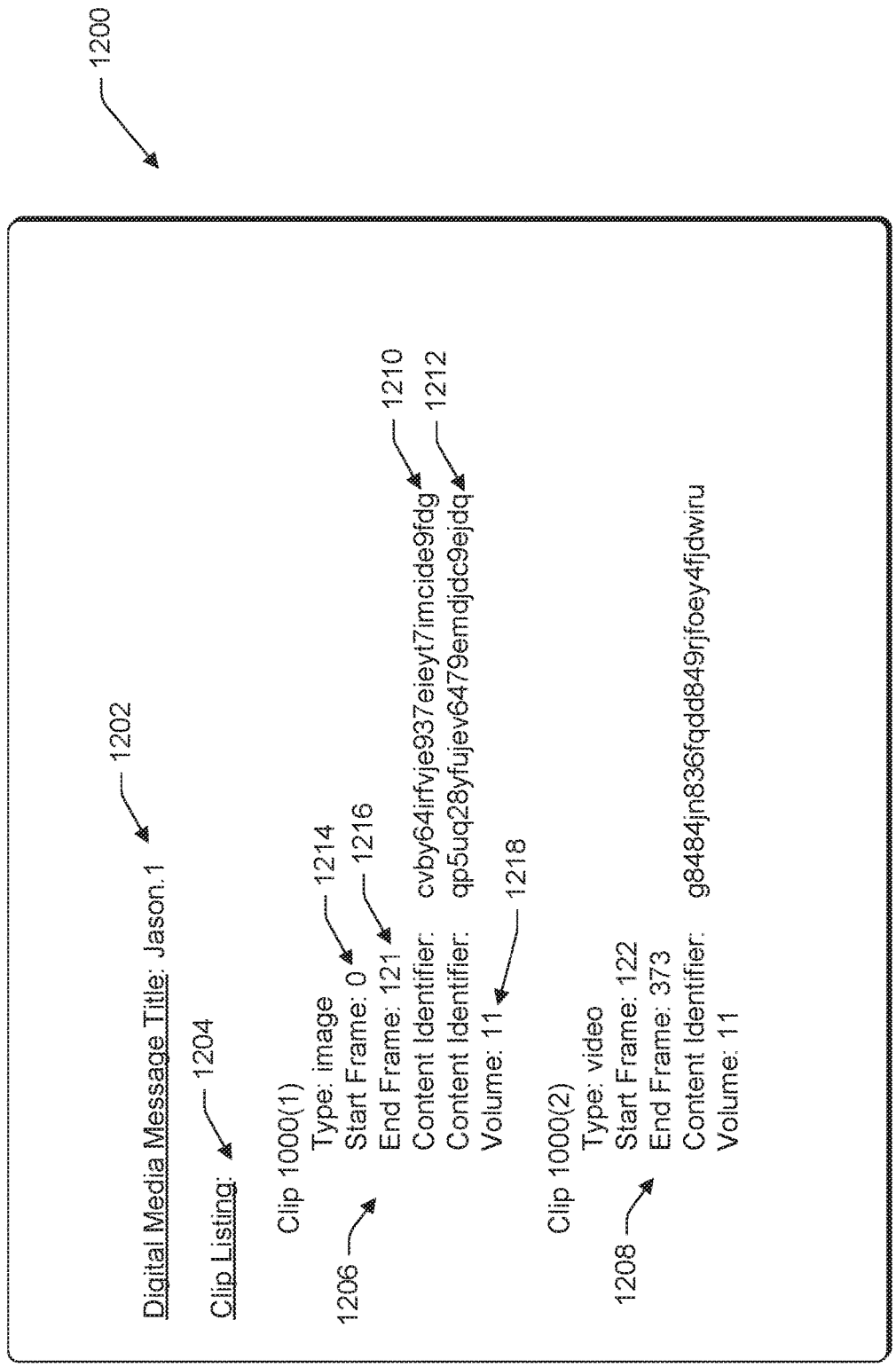
FIG. 12 shows an illustrative electronic file of the present disclosure.

At block 912, the electronic device 104 may generate one or more electronic files providing a sequential clip listing associated with rendering the digital media message 114. For example, at block 912 the media message engine 108 may cause the processor 302 and/or one or more other components of the electronic device 104 to generate an edit decision list (hereinafter "EDL"), a text file, a data file, a spreadsheet, a gif file, a tif file, and/or other file indicating an order in which various clips of the digital media message 114 are to be rendered upon playback. FIG. 12 illustrates an example electronic file 1200 of the present disclosure.

As shown in FIG. 12, an example electronic file 1200 may include a title 1202 of the digital media message 114 being generated. The electronic file 1200 may also include a time-based, frame-based, and/or otherwise sequential clip listing 1204 setting forth the content, components, and/or or other parameters of each clip 1000 in the digital media message 114, and the sequential order in which each clip 1000 is to be rendered. For example, as shown in FIG. 12, the clip listing 1204 may include information 1206, 1208 specific to each clip 1000 of the digital media message 114. The information 1206, 1208 shown in FIG. 12 corresponds to the example clips 1000(1), 1000(2) described above with respect to FIGS. 10 and 11. In such examples, such information 1206, 1208 may include the content identifiers 1210, 1212 described above with respect to blocks 906, 908. Such information 1206, 1208 may also include a first indicator 1214 identifying a first frame (e.g., a start frame) of the digital media message 114 corresponding to a digital content segment 112 being rendered in the respective clip. The information 1206, 1208 may also include a second indicator 1216 identifying a second frame (e.g., an end frame) of the digital media message 114 corresponding to a digital content segment 112 being rendered in the respective clip. In such examples, the first and second identifiers 1214, 1216 may indicate the frames of the digital media message 114 at which the corresponding digital content segment(s) 112 is/are to start and stop, respectively. In still further examples, the information 1206, 1208 may include at least one additional indicator 1218 identifying a volume level corresponding to the digital content segment 112 being rendered in the respective clip.

It is understood that the various indicators described above with respect to the electronic file 1200 are merely examples. In further embodiments, the electronic files 1200 of the present disclosure may include more than, less than, and/or different indicators than those described herein. Additionally, the order in which the clips 1000(1), 1000(2) are set forth in the clip listing 1204 may correspond to the order in which the digital content segments 112 are generated, organized, and/or otherwise arranged during the process of generating a digital media message 114. Such an order may correspond to, for example, the order set forth in the play sequence 502. Additionally, such an order may be defined by the frames indicated by the identifiers 1214, 1216.

It is also understood that the sequential clip listing 1204 included in the electronic file 1200 may be made up of the various clips 1000(1), 1000(2) described above, and such clips 1000(1), 1000(2) may each comprise respective frame groups formed from the plurality of frames to be included in the digital media message 114. In this way, each frame group may comprise a respective clip 1000 of the digital media message 114. Further, rendering the digital media message 114 in accordance with the sequential clip listing 1204 may cause the digital content segments 12 to be rendered in accordance with the indicators 1214, 1216 corresponding to each respective clip 1000. For example, when rendering the digital media message 114 in accordance with the electronic file 1200 shown in FIG. 12, in clip 1000(1) the digital content segment 112 associated with the identifier 1210 will be rendered from frame 0 of the digital media message 114 to frame 121. Likewise, in clip 1000(1) the digital content segment 112 associated with the identifier 1212 will be rendered from frame 0 of the digital media message 114 to frame 121. Accordingly, in some examples, rendering a digital media message 114 in accordance with an electronic file 1200, such as the example electronic file 1200 shown in FIG. 12, may cause a digital image to be presented and/or otherwise rendered on the electronic device simultaneously with an audio segment, and/or other digital content segment 112, from a first frame of the digital media message 114 to a second frame.

At block 914 the electronic device 104 may provide one or more of the electronic files 1200 described herein to the server computer 102 via the network 106. For example, at block 914 the media message engine 108 may cause the processor 302, and/or one or more communication interfaces or other like hardware and/or software devices or components of the electronic device 104 to transfer an EDL file or other like file 1200 from the electronic device 104 to the server computer 102. In some examples, the electronic file 1200 may be transferred by the electronic device 104 to the server computer 102 substantially in real time at block 914. For example, in such embodiments the electronic file 1200 may be transferred to the server computer 102 as the digital content segment 112 is being generated. In some example embodiments, the electronic device 104 may transfer the electronic file 1200 to the server computer 102 separately from at least one of the digital content segments 112 transferred to the server computer 102 by electronic device 104 at block 910. In such examples, at least one of the digital content segments 112 may be transferred to the server computer 102 by a first signal generated by the electronic device 104, and electronic file 1200 may be transferred to the server computer 102 by a second signal generated by the electronic device 104 different from the first signal. In still further examples, a first digital content segment 112(1) may be transferred to the server computer 102 via a first signal generated by the electronic device 104 and sent using the network 106, a second digital content segment 112(2) may be transferred to the server computer 102 via a second signal generated by the electronic device 104 separate from the first signal and sent using the network 106, and electronic file 1200 may be transferred to the server computer 102 via a third signal generated by the electronic device 104, separate from the first and second signals, and sent using the network 106.

In this way, the various digital content segments 112 described herein may be sent to the server computer 102 for storage and/or for further use in generating and/or rendering a digital media message 114, and the digital content segments 112 may be provided to the server computer 102 bearing no association with the respective electronic device 104. In some examples, the only information linking the digital content segments 112 provided to the server computer 102 at block 910 with the digital media message 114 being generated by a user 116 of the electronic device 104 may be the electronic file 1200 identifying the digital content segments 112 by their respective unique identifiers 1210, 1212. Accordingly, in some examples the digital content segments 112 provided to the server computer 102 at block 910 may be stored in a first database, data store, division, and/or other first portion of the memory 204, and the electronic file 1200 provided to the server computer 102 at block 914 may be stored in a second database, data store, division, and/or other second portion of the memory 204 different from the first portion. In some examples, the electronic file 1200 may be stored in the second portion of the memory 204 in association with a telephone number, serial number, id number, and/or other like indicator uniquely identifying an electronic device 118 of an intended recipient of the digital media message 114.

At block 916 the electronic device 104 may provide instructions to the server computer 102 via the network 106. For example, at block 916 the media message engine 108 may cause the processor 302, and/or one or more communication interfaces or other like hardware and/or software devices or components of the electronic device 104 to generate and send a signal comprising instructions to share the digital media message 114 with a second electronic device 118 different from the electronic device 104 via the network 106. In such examples, the instructions may include a telephone number, serial number, id number, and/or other like indicator uniquely identifying the electronic device 118, and the electronic device 118 may belong to an intended recipient of the digital media message 114.

In any of the example embodiments described herein, the server computer 102 may generate one or more additional electronic files using the various digital content segments 112 provided by the electronic device 104 at block 910. One or more such additional electronic files may also be generated by the server computer 102 based on the electronic file 1200 provided by the electronic device 104 at block 914. The server computer 102 may generate one or more such additional electronic files in response to receiving the instructions provided at block 916 or in response to receiving the electronic file 1200 at block 914.

For example, the server computer 102 may generate a first additional electronic file comprising a plurality of frame groups formed from at least one of the digital content segments 112 provided by the electronic device 104 at block 910. In such examples, the first additional electronic file may comprise a plurality of frames of the digital media message 114, and may be optimized by the server computer 102 for the purpose of streaming the digital media message 114 from the server computer 102 to an additional electronic device 118 via the network 106. For example, in generating such a first additional electronic file, the server computer 102 may break up one or more of the clips 1000 identified by the electronic file 1200 into frame groups. In such examples, the frame groups may be subgroups of frames that, together, make up the one or more clips 1000 of the digital media message 114. The server computer 102 may then remove digital content from each of the frame groups (such as from the audio track 1002, the video track 1004, etc.) and/or may otherwise modify the quality and/or fidelity level of the individual frames within each of the frame groups. In some examples, one or more entire frames may be removed from one or more of the frame groups. As a result, the various different frame groups formed by the server computer 102 may have a different respective quality levels. For example, a first frame group formed by the server computer 102 may have a first level of fidelity, and a second frame group formed by the server computer 102 may have a second level of fidelity different from the first level of fidelity. This difference in the level of fidelity may, in some instances, be perceptible when the resulting digital media message (i.e., the first additional electronic file) is streamed and/or otherwise rendered.

Additionally or alternatively, the server computer 102 may generate a second additional electronic file that is optimized for uploading by the server computer 102 to an additional electronic device 118 and/or for downloading by the electronic device 118. In such examples, the second additional electronic file may comprise digitally compressed and/or otherwise modified version of one or more frames of the plurality of frames making up the digital media message 114. Accordingly, in generating such an additional electronic file, the server computer 102 may compress the various frames of digital media message 114 identified by the electronic file 1200. Processing and/or handling such an example second additional electronic file may require less network bandwidth, fewer processor resources, and/or reduced memory storage space relative to a corresponding digital media message 114, rendered using the digital content segments 112 provided by the electronic device 104 at block 910.

Moreover, in any of the example embodiments described herein, the instructions provided at block 916 may cause the server computer 102 generate and/or provide a signal to the electronic device 118 via the network 106, and using the indicator uniquely identifying the electronic device 118. In such examples, the signal generated by the server computer 102 may be provided to the electronic device 118 via at least one of a text message, an email, and/or a website, such as a social media website. Additionally, in such examples, the signal provided by the server computer 102 may include a request for permission associated with sharing the digital media message 114. For example, such a signal may request that a user 120 of the electronic device 118 provide permission to the server computer 102 for sharing the digital media message 114.

In some examples, in response to requesting permission associated with sharing the digital media message 114, the server computer 102 may receive additional instructions from the electronic device 118 via the network 106. For example, in response to receiving the signal provided by the server computer 102, the user 120 of the electronic device 118 may grant permission to the server computer 102 to share the media message 114. In such examples, in response to receiving such additional instructions and/or such permission from the electronic device 118, the server computer 102 may stream the first additional electronic file described above, via the network 106. In such examples, the user 120 may view the digital media message 114 without downloading and/or otherwise receiving the digital content segments 112 utilized to render the digital media message 114. Additionally or alternatively, in response to receiving such additional instructions and/or such permission from the electronic device 118, the server computer 102 may transfer the second additional electronic file described above to the electronic device 118 via the network 106. In such examples, the server computer 102 may upload the compressed versions of the digital content segments 112 to the electronic device 118 for local rendering and/or viewing on the electronic device 118.

Figure 13:
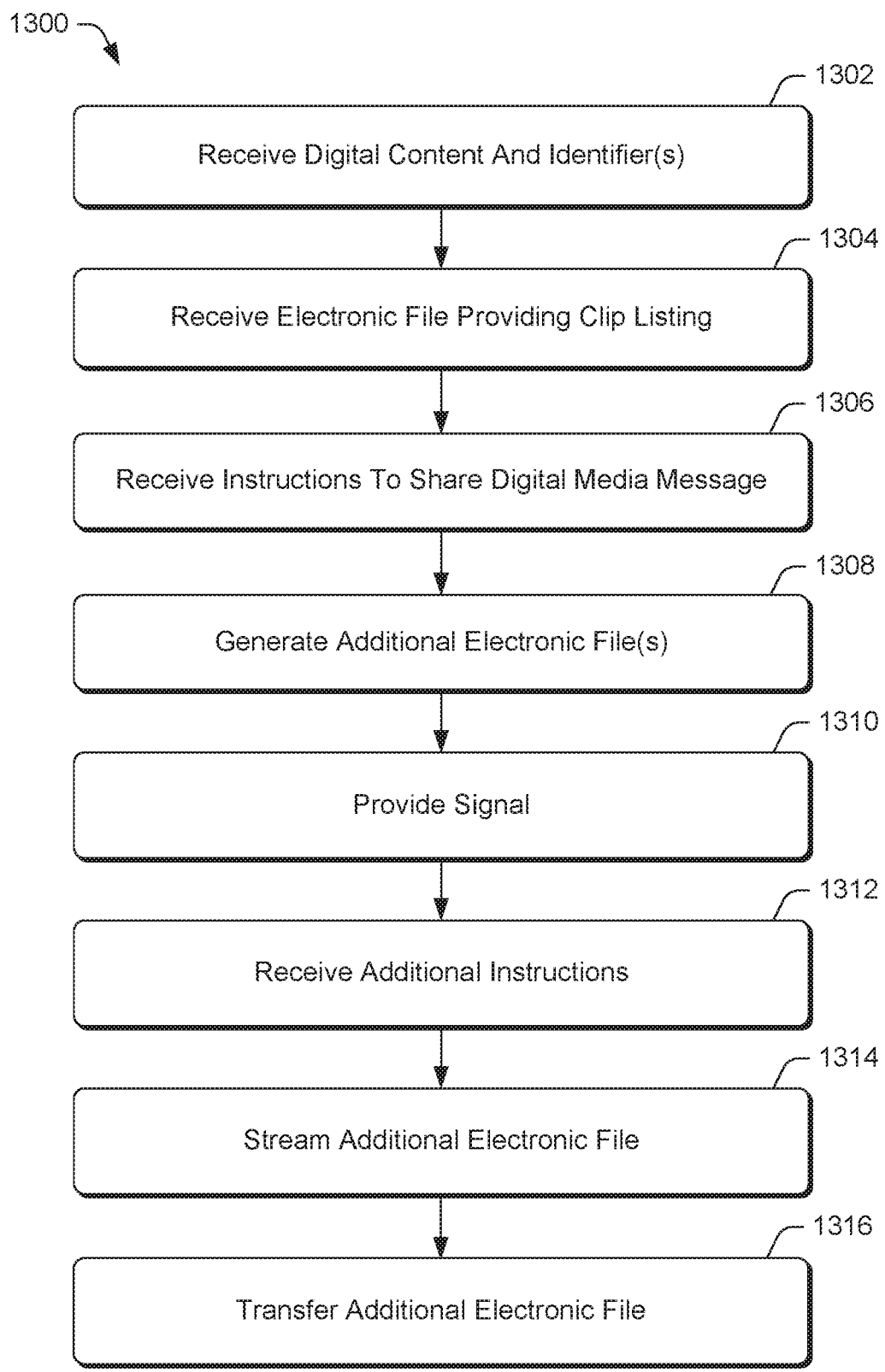
FIG. 13 is a flow diagram illustrating another example method of the present disclosure.

FIG. 13 illustrates another an example method 1300 associated with generating and sharing a digital media message 114. Similar to the method 900, the example method 1300 is illustrated as a collection of steps in a logical flow diagram, which represents operations that can be implemented in hardware, software, or a combination thereof. In the context of software, the steps represent computer-executable instructions stored in memory. When such instructions are executed by one or more processors, such instructions may cause the processor, various components of a server computer, and/or the server computer, generally, to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1300 is described with reference to the environment 100 of FIG. 1 and, in particular, with the server computer 102.

At block 1302, the server computer 102 may receive various digital content and corresponding unique identifiers from one or more electronic devices 104, and via the network 106. For example, as described above with respect to FIG. 9, the electronic device 104 may receive an input indicating selection of and/or may otherwise corresponding to an image, a video, an audio segment, and/or any other digital content segment 112(1) stored in the memory 304 of the electronic device 104. For example, a user 116 may provide a touch and hold input via the display 402 and such an input may indicate that the user 116 has selected a digital image corresponding to a particular thumbnail 410(1) for inclusion in a digital media message 114. Additionally, receiving such an input may cause the electronic device 104 to capture a video segment, audio segment, photo, digital image, or other such digital content segment (e.g., a second digital content segment 112(2)) using one or more of the user interface devices 314. For example, the processor 302 may cause a microphone, digital camera, and/or other user interface 314 of the electronic device 104 to capture a digital content segment 112(2) in response to the input described above.

Moreover, as described with respect to FIG. 9 the electronic device 104 may generate a first identifier that is unique to the digital content segment 112(1) and a second identifier that is unique to the digital content segment 112(2). For example, the media message engine 108 may cause the processor 302 and/or other components of the electronic device 104 to generate a unique series of numbers, letters, symbols, and/or other identifiers 1210, 1212. Additionally, the electronic device 104 may link, couple, attach, and/or otherwise associate the first identifier 1210 with the digital content segment 112(1) in the memory 304. The electronic device 104 may also link, couple, attach, and/or otherwise associate the second identifier 1212 with the digital content segment 112(2) in the memory 304.

Further, the electronic device 104 may provide one or more of the digital content segments 112(1), 112(2) described herein to the server computer 102 via the network 106. For example, the media message engine 108 may cause the processor 302, and/or one or more communication interfaces or other like hardware and/or software devices or components of the electronic device 104 to transfer at least one of the digital content segments 112(1), 112(2) from the electronic device 104 to the server computer 102. Additionally, the first identifier 1210 may be transferred in association with the digital content segment 112(1) (e.g., the digital image) when the digital content segment 112(1) is transferred by the electronic device 104 to the server computer 102, and the second identifier 1212 may be transferred in association with the digital content segment 112(2) (e.g., the audio segment) when the digital content segment 112(2) is transferred by the electronic device 104 to the server computer 102. Accordingly, at block 1302 the server computer 102 may receive the digital content segments 112(1), 112(2) and identifiers 1210, 1212 described above.

At block 1304 the server computer 102 may receive an electronic file 1200 from the electronic device 104, via the network 106. For example, as noted above the electronic device 104 may generate one or more electronic files 1200 providing a sequential clip listing associated with rendering the digital media message 114. An example electronic file 1200 may include a title 1202 of the digital media message 114 being generated. The electronic file 1200 may also include a time-based, frame-based, and/or otherwise sequential clip listing 1204 setting forth the content, components, and/or or other parameters of each clip 1000 in the digital media message 114, and the sequential order in which each clip 1000 is to be rendered. The electronic file 1200 may further include the content identifiers 1210, 1212 described above, a first indicator 1214 identifying a first frame (e.g., a start frame) of the digital media message 114 corresponding to a digital content segment 112 being rendered in the respective clip, and a second indicator 1216 identifying a second frame (e.g., an end frame) of the digital media message 114 corresponding to a digital content segment 112 being rendered in the respective clip. The electronic file 1200 may also include at least one additional indicator 1218 identifying a volume level corresponding to the digital content segment 112 being rendered in a respective clip 1000. The electronic device 104 may transfer such an electronic file 1200 to the server computer 102, and the server computer 102 may receive the electronic file 1200 at block 1304.

At block 1306 the server computer 102 may receive instructions from the electronic device 104 via the network 106 to share the digital media message with an additional electronic device 118 via the network 106. Such instructions may include, for example, a third indicator (e.g., a telephone number, serial number, id number, and/or other like indicator) uniquely identifying the electronic device 118. For example, as noted above the media message engine 108 may cause the processor 302, and/or one or more communication interfaces or other like hardware and/or software devices or components of the electronic device 104 to generate and send an instruction signal to the server computer 102 via the network 106. The server computer 102 may receive such a signal at block 1306.

At block 1308 the server computer 102 may generate one or more additional electronic files using the various digital content segments 112 received from the electronic device 104. One or more such additional electronic files may also be generated by the server computer 102 based on the electronic file 1200 received from the electronic device 104. The server computer 102 may generate one or more such additional electronic files in response to receiving the instructions or in response to receiving the electronic file 1200.

For example, at block 1308 the server computer 102 may generate a first additional electronic file comprising a plurality of frame groups formed from at least one of the digital content segments 112 provided by the electronic device 104 at block 910. In such examples, the first additional electronic file may comprise a plurality of frames of the digital media message 114, and may be optimized by the server computer 102 for the purpose of streaming the digital media message 114 from the server computer 102 to the electronic device 118 via the network 106. For example, in generating such a first additional electronic file, the server computer 102 may break up one or more of the clips 1000 identified by the electronic file 1200 into frame groups. As noted above, the various different frame groups formed by the server computer 102 at block 1308 may have a different respective quality levels. For example, a first frame group formed by the server computer 102 may have a first level of fidelity, and a second frame group formed by the server computer 102 may have a second level of fidelity different from the first level of fidelity.

Additionally or alternatively, at block 1308 the server computer 102 may generate a second additional electronic file that is optimized for uploading by the server computer 102 to the electronic device 118 and/or for downloading by the electronic device 118. In such examples, the second additional electronic file may comprise digitally compressed and/or otherwise modified version of one or more frames of the plurality of frames making up the digital media message 114.

At block 1310 the server computer 102 may generate one or more signals and may provide one or more such signals to the electronic device 18 via at least one of a text message, an email, and/or a website, such as a social media website. Additionally, in such examples, the signal provided by the server computer 102 may include a request for permission associated with sharing the digital media message 114. For example, such a signal may request that a user 120 of the electronic device 118 provide permission to the server computer 102 for sharing the digital media message 114.

In response to requesting permission associated with sharing the digital media message 114, the server computer 102 may, at block 1312, receive additional instructions from the electronic device 118 via the network 106. For example, in response to receiving the signal provided by the server computer 102, the user 120 of the electronic device 118 may grant permission to the server computer 102 to share the media message 114. In such examples, in response to receiving such additional instructions and/or such permission from the electronic device 118, the server computer 102 may, at block 1314, stream the first additional electronic file described above, via the network 106. In such examples, the user 120 may view the digital media message 114 without downloading and/or otherwise receiving the digital content segments 112 utilized to render the digital media message 114.

Additionally or alternatively, in response to receiving such additional instructions and/or such permission from the electronic device 118, the server computer 102 may, at block 1316, transfer the second additional electronic file described above to the electronic device 118 via the network 106. In such examples, the server computer 102 may upload the compressed versions of the digital content segments 112 to the electronic device 118 for local rendering and/or viewing on the electronic device 118.

In some examples, embodiments of the present disclosure may enable a user 120 of the electronic device 118 to edit, alter, and/or otherwise modify a digital media message 114 generated by the user 116 of the device 104. For example, in embodiments in which the second additional electronic file is transferred to the electronic device 118 at block 1316, the electronic device 118 may render the digital media message 114 corresponding to the second additional electronic file locally. The user 120 may then add content, delete content, reorder content, and/or otherwise modify the digital media message 114 locally on the electronic device 118. Additionally or alternatively, the server computer 102 may transfer the master content (e.g. the original/native digital content segments 112 used to generate the digital media message 114) to the electronic device 118 for rendering and/or modification. In any of the example embodiments described herein, the electronic device 118 may generate a second electronic file similar to the electronic file 1200 described above with respect to FIG. 12. For example, such a second electronic file may comprise an additional EDL file, text file, data file, and/or other like file, and may include a time-based, frame-based, and/or otherwise sequential clip listing setting forth the content, components, and/or or other parameters of each clip in the modified digital media message, and the sequential order in which each clip is to be rendered. Electronic device 118 may transfer the second electronic file to the server computer 102 via the network 106. Upon receiving the second electronic file from the electronic device 118, the server computer 102 may store the second electronic file with the first electronic file 1200 in the memory 204. In this way, the server computer may preserve various editing decisions over time, by saving various EDLs generated by multiple users 116, 120.

Figure 14:
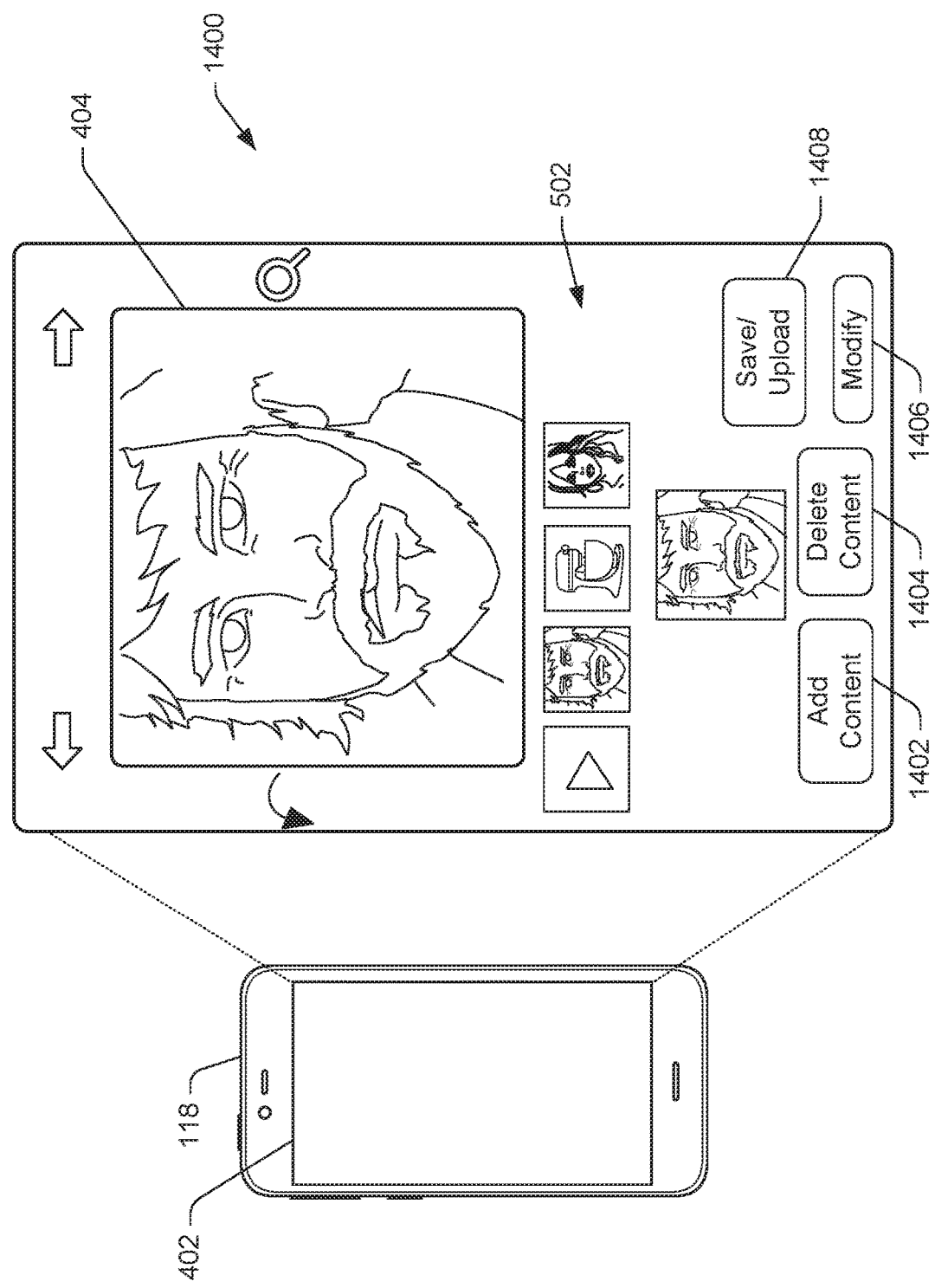
FIG. 14 shows another illustrative user interface screen displayed on an electronic device that enables users to create and/or modify a digital media message.

FIG. 14 illustrates an example user interface 1400 of the present disclosure configured to assist the user 120 in modifying a digital media message 114 rendered on the electronic device 118. In example embodiments, the user interface 1400 may include one or more controls configured to assist the user 120 in making further modifications to one or more of the digital content segments 112, the play sequence, and/or other components of the digital media message 114. For example, the user interface 1400 may include a control 1402 configured to enable the user 120 to add one or more images, videos, photos, audio clips, and/or other content to the digital media message 114. In example embodiments, the media message engine 108 may receive an input, such as a touch input, indicative of selection f the control 1402 by the user 120. In response to receiving such an input, the media message engine 108 may enable the user 120 to browse various photos, images, videos, and/or other content stored in the memory 304 and/or in the memory 204 of the server 102. Additionally and/or alternatively, in response to receiving such an input, the media message engine 108 may enable the user 120 to perform a web-based search, such as via one or inure search engines or applications of the electronic device 118, for such content. The user 120 may be permitted to select one or more such content items for use. Upon selection of such a content item, the media message engine 108 may add the selected item to the play sequence of the digital media message 114 and/or may combine the selected item with one or more content segments 112 of the digital media message 114. Additionally, the user interface 1400 may include one or more controls 1404 configured to enable the user 120 to delete one or more audio clips, video clips, segments, files, and/or other content from the digital media message 114.

The user interface 1400 may further include one or more controls 1406 configured to enable the user 120 to modify one or more of the digital content segments 112, the play sequence, and/or other components of the digital media message 114. Such controls 1406 may comprise, among other things, any audio, video, image, or other editing tools known in the art. In example embodiments, such controls 1406 may provide editing functionality enabling the user 120 to move, modify, augment, cut, paste, copy, save, or otherwise alter portions of each digital content segment 112 as part of generating a digital media message 114. Additionally, the control 1406 may enable the user 120 to cut, paste, draw, rotate, flip, shade, color, fade, darken, and/or otherwise modify various aspects of the digital media message 114 and/or various digital content segments 112 included in the play sequence thereof. In some embodiments, at least one of the controls 1402, 1404, 1406 may be similar to and/or the same as one or more of the controls 418 described above. The user interface 1400 may also include one or more navigation controls 1408 configured to enable the user 120 to save the modified digital media message 114 locally and/or at the server computer 102. In addition, the user interface 1400 or other user interfaces described herein may provide one or more additional controls operable to enable the user 120 of the device 118 to observe the creation of a digital media message 114 (by another user 116 on a separate electronic device 104) substantially in real-time. Such functionality may be possible in examples in which the clips 1000, digital content segments 112, and/or other components of the digital media message 114 are transferred to the server computer 102 in substantially real-time (such as at block 910) as the digital media message 114 is being created.

In summary, example embodiments of the present disclosure provide devices and methods for generating digital media messages as a means for communication between users in remote locations. Such digital media messages include various combinations of audio, video, images, photos, and/or other digital content segments, and can be quickly and artfully created by each user with little effort. The methods of generating such a digital media message described herein may reduce the file size and/or memory requirements of such messages. As a result, a digital media message 114 generated using the techniques described herein will require/take up less memory than a corresponding digital media message generated by other methods. Such digital media messages will also enable the various networks 106, servers 102, and/or electronic devices 104, 118 described herein to transfer, store, and/or process such digital media messages 114 more quickly and with fewer network, server, and/or device resources. As a result, such a reduction in file size and/or memory requirements will reduce overall network load/traffic, and will improve network, server, and/or electronic device performance. Such a reduction in file size and/or memory requirements will enable the various networks 106, servers 102, and/or electronic devices 104, 118 described herein to provide, render, display, and/or otherwise process such digital media messages 114 more quickly and with fewer network, server, and/or device resources.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    receiving, by a computing device, a first user input selecting a graphical element presented on a display of the computing device while a particular still image of a plurality of still images is displayed;
    while the computing device continues to receive the first user input and continues to display the particular still image, capturing, by the computing device, audio data;
    storing, by the computing device, the particular still image and the audio data as a first message segment responsive to detecting that the first user input has terminated; and
    displaying a play sequence associated with a media message comprising one or more message segments shown in sequential order, wherein the particular still image of the first message segment is shown, at least initially, in a last position in the play sequence,
    wherein the play sequence and the plurality of still images are displayed simultaneously on the display.

2. The method of claim 1, further comprising, prior to receiving the first user input:
    receiving, by the computing device, a selection of the particular still image of the plurality of still images.

3. The method of claim 2, further comprising:
    presenting a plurality of thumbnail images representing previously captured media items in a library of media items, wherein receiving the selection of the particular still image includes selecting one of the plurality of thumbnail images.

4. The method of claim 1, wherein the still image is presented for a duration of the audio data responsive to playback of the first message segment, wherein the audio data corresponds to audio signals captured by a sound sensor of the computing device, and wherein the play sequence comprises one or more thumbnail images indicative of respective message segments that have previously been added to the media message.

5. The method of claim 4, further comprising:
    generating a plurality of video frames corresponding to the duration of the audio data, wherein each of the plurality of video frames includes the particular still image corresponding to the first message segment, and wherein the duration corresponds to a period of time of the first user input.

6. The method of claim 1, further comprising:
    receiving, by the computing device, a second user input to initiate playback of the media message;
    presenting the audio data corresponding to the first message segment when the first message segment is reached in the play sequence; and
    presenting the particular still image corresponding to the first message segment for the duration of the presentation of the audio data.

7. The method of claim 1, further comprising displaying a real-time image captured using an image sensor of the computing device simultaneously with the play sequence and the one or more still images.

8. A non-transitory computer-readable medium including one or more sequences of instructions that, when executed by one or more processors, cause the processors to perform operations comprising:
    receiving, by a computing device, a first user input selecting a graphical element presented on a display of the computing device while a particular still image of a plurality of still images is displayed;
    while the computing device continues to receive the first user input and continues to display the particular still image, capturing, by the computing device, audio data;

storing, by the computing device, the particular still image and the audio data as a first message segment responsive to detecting that the first user input has terminated; and displaying a play sequence associated with a media message comprising one or more message segments shown in sequential order, wherein the particular still image of the first message segment is shown, at least initially, in a last position in the play sequence, wherein the play sequence and the plurality of still images are displayed simultaneously on the display.

9. The non-transitory computer-readable medium of claim 8, wherein the instructions cause the processors to perform operations, prior to receiving the first user input, comprising:

receiving, by the computing device, a selection of the particular still image of the plurality of still images.

10. The non-transitory computer-readable medium of claim 9, wherein the instructions cause the processors to perform operations comprising:

presenting a plurality of thumbnail images representing previously captured media items in a library of media items, wherein receiving the selection of the particular still image includes selecting one of the plurality of thumbnail images.

11. The non-transitory computer-readable medium of claim 8, wherein the still image is presented for a duration of the audio data responsive to playback of the first message segment, wherein the audio data corresponds to audio signals captured by a sound sensor of the computing device, and wherein the play sequence comprises one or more thumbnail images indicative of respective message segments that have previously been added to the media message.

12. The non-transitory computer-readable medium of claim 11, wherein the instructions cause the processors to perform operations comprising:

generating a plurality of video frames corresponding to the duration of the audio data, wherein each of the plurality of video frames includes the particular still image corresponding to the first message segment, and wherein the duration corresponds to a period of time of the first user input.

13. The non-transitory computer-readable medium of claim 8, wherein the instructions cause the processors to perform operations comprising:

receiving, by the computing device, a second user input to initiate playback of the media message;

presenting the audio data corresponding to the first message segment when the first message segment is reached in the play sequence; and presenting the particular still image corresponding to the first message segment for the duration of the presentation of the audio data.

14. The non-transitory computer-readable medium of claim 8, wherein the instructions cause the processors to perform operations comprising displaying a real-time image captured using an image sensor of the computing device simultaneously with the play sequence and the one or more still images.

15. A system comprising:
one or more processors; and
a non-transitory computer-readable medium including one or more sequences of instructions that, when executed by the one or more processors, cause the processors to perform operations comprising:

receiving, by a computing device, a first user input selecting a graphical element presented on a display of the computing device while a particular still image is displayed;

while the computing device continues to receive the first user input and continues to display the particular still image, capturing, by the computing device, audio data;

storing, by the computing device, the particular still image and the audio data as a first message segment responsive to detecting that the first user input has terminated; and displaying a play sequence associated with a media message comprising one or more message segments shown in sequential order, wherein the particular still image of the first message segment is shown, at least initially, in a last position in the play sequence, wherein the play sequence and the plurality of still images are displayed simultaneously on the display.

16. The system of claim 15, wherein the instructions cause the processors to perform operations, prior to receiving the first user input, comprising:

receiving, by the computing device, a selection of the particular still image of the plurality of still images.

17. The system of claim 16, wherein the instructions cause the processors to perform operations comprising:

presenting a plurality of thumbnail images representing previously captured media items in a library of media items, wherein receiving the selection of the particular still image includes selecting one of the plurality of thumbnail images.

18. The system of claim 15, wherein the still image is presented for a duration of the audio data responsive to playback of the first message segment, wherein the audio data corresponds to audio signals captured by a sound sensor of the computing device, wherein the play sequence comprises one or more thumbnail images indicative of respective message segments that have previously been added to the media message and wherein the instructions cause the processors to perform operations comprising:

generating a plurality of video frames corresponding to the duration of the audio data, wherein each of the plurality of video frames includes the particular still image corresponding to the first message segment, and wherein the duration corresponds to a period of time of the first user input.

19. The system of claim 15, wherein the instructions cause the processors to perform operations comprising:

receiving, by the computing device, a second user input to initiate playback of the media message;

presenting the audio data corresponding to the first message segment when the first message segment is reached in the play sequence; and presenting the particular still image corresponding to the first message segment for the duration of the presentation of the audio data.

20. The system of claim 15, wherein the instructions cause the processors to perform operations comprising displaying a real-time image captured using an image sensor of the computing device simultaneously with the play sequence and the one or more still images.

* * * * *